(12) United States Patent
Suarez et al.

(10) Patent No.: US 11,899,694 B2
(45) Date of Patent: Feb. 13, 2024

(54) TECHNIQUES FOR TEMPORALLY DYNAMIC LOCATION-BASED PREDICTIVE DATA ANALYSIS

(71) Applicant: UnitedHealth Group Incorporated, Minnetonka, MN (US)

(72) Inventors: Mario M. Suarez, Minnetonka, MN (US); Elijah J. Fiore, Minnetonka, MN (US); Stephen R. Dion, Minnetonka, MN (US); Craig S. Herman, Minnetonka, MN (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 179 days.

(21) Appl. No.: 17/316,043

(22) Filed: May 10, 2021

(65) Prior Publication Data

US 2022/0100781 A1  Mar. 31, 2022

Related U.S. Application Data

(60) Provisional application No. 63/085,219, filed on Sep. 30, 2020.

(51) Int. Cl.
*G06F 16/28* (2019.01)
*G06F 3/0481* (2022.01)
(Continued)

(52) U.S. Cl.
CPC .......... *G06F 16/287* (2019.01); *G06F 3/0481* (2013.01); *G06F 16/212* (2019.01); *G06F 16/288* (2019.01); *G06F 18/2321* (2023.01)

(58) Field of Classification Search
CPC .... G06F 16/287; G06F 16/212; G06F 16/288; G06F 18/2321; G06F 3/0481; G16H 50/80
See application file for complete search history.

(56) References Cited

U.S. PATENT DOCUMENTS 7,024,370 B2    4/2006  Epler et al.
8,335,298 B2   12/2012  Clawson
(Continued)

FOREIGN PATENT DOCUMENTS

| CN | 102866436 A | 1/2013 |
|---|---|---|
| CN | 108172301 A | 6/2018 |
| IN | 202011013374 A | 6/2020 |

OTHER PUBLICATIONS

Miller MW, Conner MM. Epidemiology of chronic wasting disease in free-ranging mule deer: spatial, temporal, and demographic influences on observed prevalence patterns. Journal of Wildlife Diseases. Apr. 2005;41(2):275-90. (Year: 2005).*

(Continued)

*Primary Examiner* — Mohsen Almani
(74) *Attorney, Agent, or Firm* — Alston & Bird LLP

(57) ABSTRACT

Various embodiments of the present invention provide methods, apparatus, systems, computing devices, computing entities, and/or the like for performing temporally dynamic location-based predictive data analysis. Certain embodiments of the present invention utilize systems, methods, and computer program products that perform temporally dynamic location-based predictive data analysis by utilizing at least one of prevalence-based density modeling data objects, growth-based density modeling data objects, and environment-based density modeling data objects.

20 Claims, 21 Drawing Sheets

(51) Int. Cl.
  *G06F 16/21* (2019.01)
  *G06F 18/2321* (2023.01)
  *G06F 9/451* (2018.01)

(56) References Cited

U.S. PATENT DOCUMENTS

| | | | |
|---|---|---|---|
| 8,862,448 B2 | 10/2014 | Holmes et al. | |
| 9,536,052 B2 | 1/2017 | Amarasingham et al. | |
| 9,990,747 B1* | 6/2018 | Bhat | G06T 11/206 |
| 10,188,048 B2 | 1/2019 | Nelson et al. | |
| 10,366,791 B1 | 7/2019 | Thiagarajan et al. | |
| 10,592,310 B2 | 3/2020 | Li et al. | |
| 11,056,242 B1* | 7/2021 | Jain | G16H 10/60 |
| 2009/0082997 A1* | 3/2009 | Tokman | G16H 50/80 |
| | | | 702/179 |
| 2017/0186093 A1 | 6/2017 | Jones et al. | |
| 2017/0316324 A1 | 11/2017 | Barrett et al. | |
| 2019/0252078 A1 | 8/2019 | Schubert et al. | |
| 2020/0373018 A1* | 11/2020 | Segal | G16H 50/70 |
| 2021/0050116 A1* | 2/2021 | Sabeti | H04W 4/029 |
| 2021/0125732 A1* | 4/2021 | Patel | G06N 3/084 |
| 2022/0093276 A1* | 3/2022 | Patel | G16H 40/63 |

OTHER PUBLICATIONS

Lao KK, Deb S, Thampi SM, Fong S. A novel disease outbreak prediction model for compact spatial-temporal environments. InAdvances in Signal Processing and Intelligent Recognition Systems 2014 (pp. 439-450). Springer International Publishing. (Year: 2014).*

Huang R, Liu M, Ding Y. Spatial-temporal distribution of COVID-19 in China and its prediction: A data-driven modeling analysis. The Journal of Infection in Developing Countries. Mar. 31, 2020;14(03):246-53. (Year: 2020).*

Fronza R, Lusic M, Schmidt M, Lucic B. Spatial-temporal variations in atmospheric factors contribute to SARS-CoV-2 outbreak. Viruses. May 27, 2020;12(6):588. (Year: 2020).*

"US COVID Atlas," The University of Chicago—The Center For Spatial Data Science, (6 pages), (article, online), [Retrieved from the Internet Jun. 29, 2021] <https://theuscovidatlas.org/>.

Ardabili, Sina F. et al. "COVID-19 Outbreak Prediction With Machine Learning," Algorithms, vol. 13, No. 10:249, Oct. 1, 2020, (36 pages), DOI: 10.3390/a13100249.

Balcan, Duygu et al. "Modeling The Spatial Spread of Infectious Diseases: The Global Epidemic and Mobility Computational Model," Journal of Computational Science, vol. 1, No. 3, Aug. 1, 2010, (41 pages), DOI: 10.1016/j.jocs.2010.07.002.

Bird, Jordan J. "Country-Level Pandemic Risk and Preparedness Classification Based On COVID-19 Data: A Machine Learning Approach," PLoS ONE, vol. 15, No. 10:e0241332, Oct. 28, 2020, pp. 1-20, DOI: org/10.1371/jorunal.pone.0241332.

Laskowski Marek et al. "The Impact of Demographic Variables on Disease Spread: Influenza in Remote Communities," Scientific Reports, vol. 1, No. 105, Oct. 4, 2011, pp. 107, DOI: 10.1038/srep00105.

Zhou, Ying et al. "Effects Of Human Mobility Restrictions On The Spread Of COVID-19 In Shenzhen, China—A Modelling Study Using Mobile Phone Data," The Lancet Digital Health, vol. 2, Issue 8, Aug. 1, 2020, pp. e417-e424, DOI:https://doi.org/10.1016/S2589-7500(20)30165-5.

* cited by examiner

Looking back, we can see MSAs that best fit high-growth patterns

*Average Case Density Growth for MSAs with the same profile based on June-August* — 124)

| Rank (aug 30) | | |
|---|---|---|
| 1 | 124) Des Moines-West Des Moines, IA - 337 | |
| 2 | 820) St. Louis, MO-IL* -18 | Few MSAs with high growth profile |
| 3 | 47) Oklahoma City, OK -25 | |
| 4 | 45) Omaha-Council Bluffs, NE-IA -280 | |
| 5 | 38) Memphis, TN-MS-AR -38 | |
| 6 | 38) Nashville-Davidson--Murfreesboro--Franklin, TN* -38 | |
| 7 | 38) Tulsa OK -38 | |
| 8 | 35) Chattanooga, TN-GA -38 | |
| 9 | 35) Knoxville, TN -38 | |
| 10 | 33) Colorado Springs, CO* -17 | |
| 11 | 33) Milwaukee-Waukesha, WI* -17 | |
| 12 | 33) Provo-Orem, UT -46 | |
| 13 | 29) Salt Lake City, UT* -103 | |
| 14 | 23) Lansing-East Lansing, MI -16 | |
| 15 | 20) Bridgeport-Stamford-Norwalk, CT* -75 | |
| | | |
| 101 | -119) Lakeland-Winter Haven, FL -113 | |
| 102 | -119) Miami-Fort Lauderdale-Pompano Beach, FL* -113 | |
| 103 | -119) North Port-Sarasota-Bradenton, FL -113 | |
| 104 | -119) Orlando-Kissimmee-Sanford, FL* -113 | |
| 105 | -119) Palm Bay-Melbourne-Titusville, FL -113 | |
| 106 | -119) Pensacola-Ferry Pass-Brent, FL -133 | |
| 107 | -119) Tampa-St. Perersburg-Clearwater, FL* -113 | |
| 108 | -187) Boston-Cambridge-Newton, MA-NH* -34 | |
| 109 | -187) Springfield, MA-CT -34 | |
| 110 | -187) Worcester, MA-CT -34 | |

📶 * = MSA of Interest

FIG. 15A

Des Moines-West Des Moines, IA - 337 — # of MSA+Day combinations between June & August

1500

| aug 1 |
|---|
| 189) Jackson, MS -340 |
| 189) Kansas City, MO-KS* -340 |
| 124) St. Louis, MO-IL* -337 |
| 109) Oklahoma City, OK -105 |
| 109) Tulsa, OK -105 |
| 102) Indianapolis-Carmel-Anderson, IN* -185 |
| 102) Omaha-Council Bluffs, NE-IA -185 |
| 88) Knoxville, TN -196 |
| 88) Toledo, OH -196 |
| 82) Urban Honolulu, HI -17 |
| 72) Akron, OH -133 |
| 72) Augusta-Richmond County, GA-SC -133 |
| 72) Milwaukee-Waukesha, WI* -133 |
| 72) Minneapolis-St. Paul-Bloomington, MN-WI* -133 |
| 72) Youngstown-Warren-Boardman, OH-PA -133 |
| |
| -80) Deltona-Daytona Beach-Ormond Beach, FL -21 |
| -80) Jacksonville, FL* -21 |
| -80) Lakeland-Winter Haven, FL -21 |
| -80) North Port-Sarasota-Bradenton, FL -21 |
| -80) Orlando-Kissimmee-Sanford, FL* -21 |
| -93) Tucson, AZ* -57 |
| -95) Cape Coral-Fort Myers, FL -23 |
| -95) Tampa-St. Petersburg-Clearwater, FL* -23 |
| -119) Phoenix-Mesa-Chandler, AZ* -113 |
| -187) Louisville/Jefferson County, KY-IN* -34 |

On July 1, large # of MSAs with high growth profile

FIG. 15B

Projections based on...

Growth, change in:
- ✓ Case Density: Case / 100k Growth over 14 days
- ✓ % Positive: % positive testing over 7 days Environment, level of:
- ✓ Masks: State-level mask requirements & data state policy came in effect
- ✓ Mobility: Google Mobility data

1500

| jul1 | |
|---|---|
| 192) | Fresno, CA -102 |
| 192) | Los Angeles-Long Beach-Anaheim, CA* -102 |
| 192) | Modesto, CA -102 |
| 192) | Oxnard-Thousand Oaks-Ventura, CA -102 |
| 192) | Reverside-San Bernardino-Ontario, CA* -102 |
| 192) | Sacramento-Roseville-Folsom, CA* -102 |
| 192) | San Diego-Chula Vista-Carlsbad, CA* -102 |
| 192) | San Francisco-Oakland-Berkeley, CA -102 |
| 192) | San Jose-Sunnyvale-Santa Clara, CA -102 |
| 192) | Stackton, CA -102 |
| 189) | Austin-Round Rock-Georgetown, TX* -340 |
| 189) | Baton Rouge, LA -340 |
| 189) | Cape Coral-Fort Myers, FL -340 |
| 189) | Dallas-Fort Worth-Arlington, TX* -340 |
| 189) | Deltona-Daytona Beach-Ormond Beach, FL -340 |
|  |  |
| 6) | Boston-Cambridge-Newton, MA-NH* -148 |
| 6) | Buffalo-Cheektowaga, NY* -148 |
| 6) | New York-Newark-Jersey City, NY-NJ-PA* -148 |
| 6) | Washington-Arlington-Alexandria, DC-VA-MD-WV* -148 |
| 6) | Worcester, MA-CT -148 |
| 5) | Lancaster, MA-CT -148 |
| -15) | Bridgeport-Stamford-Norwalk, CT* -172 |
| -15) | Hartford-East Hartford-Middletown, CT* -172 |
| -15) | New Haven-Milford, CT -172 |
| -16) | Philadelphia-Camden-Wilmington, PA-NJ-DE-MD* -191 |

| % positive Change | | | MSA List | | |
|---|---|---|---|---|---|
| % positive (7 day) - 7 day delta - 15 days prior - rounded - Capped - Bins | Case Density - Delta over 15 Days | Cases (14 day)/ 100k Current Day | MSA Name | Avg. MSA Populat... | Number of Recor... |
| | | | Akron, OH | 703,479 | 2 |
| Null | 22.0 | 206.7 | Atlanta-Sandy Springs-Al... | 6,020,364 | 26 |
| | | | Augusta-Richmond Count... | 608,980 | 26 |
| -1.0% | 43.3 | 157.7 | Austin-Round Rock-Georg... | 2,227,083 | 34 |
| | | | Baton Rouge, LA | 854,884 | 8 |
| -0.5% | -7.1 | 157.4 | Birmingham-Hoover, AL | 1,090,435 | 34 |
| | | | Boise City, ID | 749,202 | 34 |
| 0.0% | 9.2 | 147.0 | Boston-Cambridge-Newto... | 4,873,019 | 7 |
| | | | Cape Coral-Fort Myers, FL | 770,577 | 26 |
| 0.5% | 19.9 | 171.4 | Charleston-North Charles... | 802,122 | 20 |
| | | | Charlotte-Concord-Gasto... | 2,636,883 | 3 |
| 1.0% | 71.0 | 218.5 | Chattanooga, TN-GA | 565,194 | 8 |
| | | | Cincinnati, OH-KY-IN | 2,221,208 | 2 |
| 1.5% | 77.0 | 267.7 | Cleveland-Elyria, OH | 2,048,449 | 2 |
| 2.0% | 125.3 | 373.2 | Columbia, SC | 838,433 | 20 |

…

TECHNIQUES FOR TEMPORALLY DYNAMIC LOCATION-BASED PREDICTIVE DATA ANALYSIS

CROSS-REFERENCES TO RELATED APPLICATION(S)

The present application claims priority to U.S. Provisional Patent Application No. 63/085,219 (filed Sep. 30, 2020), which is incorporated herein by reference in its entirety.

BACKGROUND

Various embodiments of the present invention address technical challenges related to performing predictive data analysis and address the efficiency and reliability shortcomings of existing predictive data analysis solutions.

BRIEF SUMMARY

In general, various embodiments of the present invention provide methods, apparatus, systems, computing devices, computing entities, and/or the like for performing temporally dynamic location-based predictive data analysis. Certain embodiments of the present invention utilize systems, methods, and computer program products that perform temporally dynamic location-based predictive data analysis by utilizing at least one of prevalence-based density modeling data objects, growth-based density modeling data objects, and environment-based density modeling data objects.

In accordance with one aspect, a method is provided. In one embodiment, the method comprises: determining, based at least in part on one or more prevalence-based density features for a primary local-temporal pair data object and one or more growth-based density features for the primary local-temporal pair data object, a predictive profile for the primary local-temporal pair data object; determining, based at least in part on the predictive profile, one or more predictive profile local-temporal pair data objects for the primary local-temporal pair data object; determining a prevalence-based density modeling data object, where the prevalence-based density modeling data object relates each predictive profile current periodic density measure for a predictive profile local-temporal pair data object of the one or more predictive profile local-temporal pair data objects to a predictive profile periodic density change measure for the predictive profile local-temporal pair data object; determining a growth-based density modeling data object, where the growth-based density modeling data object relates each predictive profile periodic density growth rate measure for a predictive profile local-temporal pair data object of the one or more predictive profile local-temporal pair data objects to a predictive profile periodic density change measure for the predictive profile local-temporal pair data object; determining, based at least in part on the prevalence-based density modeling data object and the growth-based density modeling data object, a projected periodic density change measure for the primary local-temporal pair data object; and performing one or more prediction-based actions based at least in part on the projected periodic density measure.

In accordance with another aspect, a computer program product is provided. The computer program product may comprise at least one computer-readable storage medium having computer-readable program code portions stored therein, the computer-readable program code portions comprising executable portions configured to: determine, based at least in part on one or more prevalence-based density features for a primary local-temporal pair data object and one or more growth-based density features for the primary local-temporal pair data object, a predictive profile for the primary local-temporal pair data object; determine, based at least in part on the predictive profile, one or more predictive profile local-temporal pair data objects for the primary local-temporal pair data object; determine a prevalence-based density modeling data object, where the prevalence-based density modeling data object relates each predictive profile current periodic density measure for a predictive profile local-temporal pair data object of the one or more predictive profile local-temporal pair data objects to a predictive profile periodic density change measure for the predictive profile local-temporal pair data object; determine a growth-based density modeling data object, where the growth-based density modeling data object relates each predictive profile periodic density growth rate measure for a predictive profile local-temporal pair data object of the one or more predictive profile local-temporal pair data objects to a predictive profile periodic density change measure for the predictive profile local-temporal pair data object; determine, based at least in part on the prevalence-based density modeling data object and the growth-based density modeling data object, a projected periodic density change measure for the primary local-temporal pair data object; and perform one or more prediction-based actions based at least in part on the projected periodic density measure.

In accordance with yet another aspect, an apparatus comprising at least one processor and at least one memory including computer program code is provided. In one embodiment, the at least one memory and the computer program code may be configured to, with the processor, cause the apparatus to: determine, based at least in part on one or more prevalence-based density features for a primary local-temporal pair data object and one or more growth-based density features for the primary local-temporal pair data object, a predictive profile for the primary local-temporal pair data object; determine, based at least in part on the predictive profile, one or more predictive profile local-temporal pair data objects for the primary local-temporal pair data object; determine a prevalence-based density modeling data object, where the prevalence-based density modeling data object relates each predictive profile current periodic density measure for a predictive profile local-temporal pair data object of the one or more predictive profile local-temporal pair data objects to a predictive profile periodic density change measure for the predictive profile local-temporal pair data object; determine a growth-based density modeling data object, where the growth-based density modeling data object relates each predictive profile periodic density growth rate measure for a predictive profile local-temporal pair data object of the one or more predictive profile local-temporal pair data objects to a predictive profile periodic density change measure for the predictive profile local-temporal pair data object; determine, based at least in part on the prevalence-based density modeling data object and the growth-based density modeling data object, a projected periodic density change measure for the primary local-temporal pair data object; and perform one or more prediction-based actions based at least in part on the projected periodic density measure.

BRIEF DESCRIPTION OF THE DRAWINGS

Figure 1:
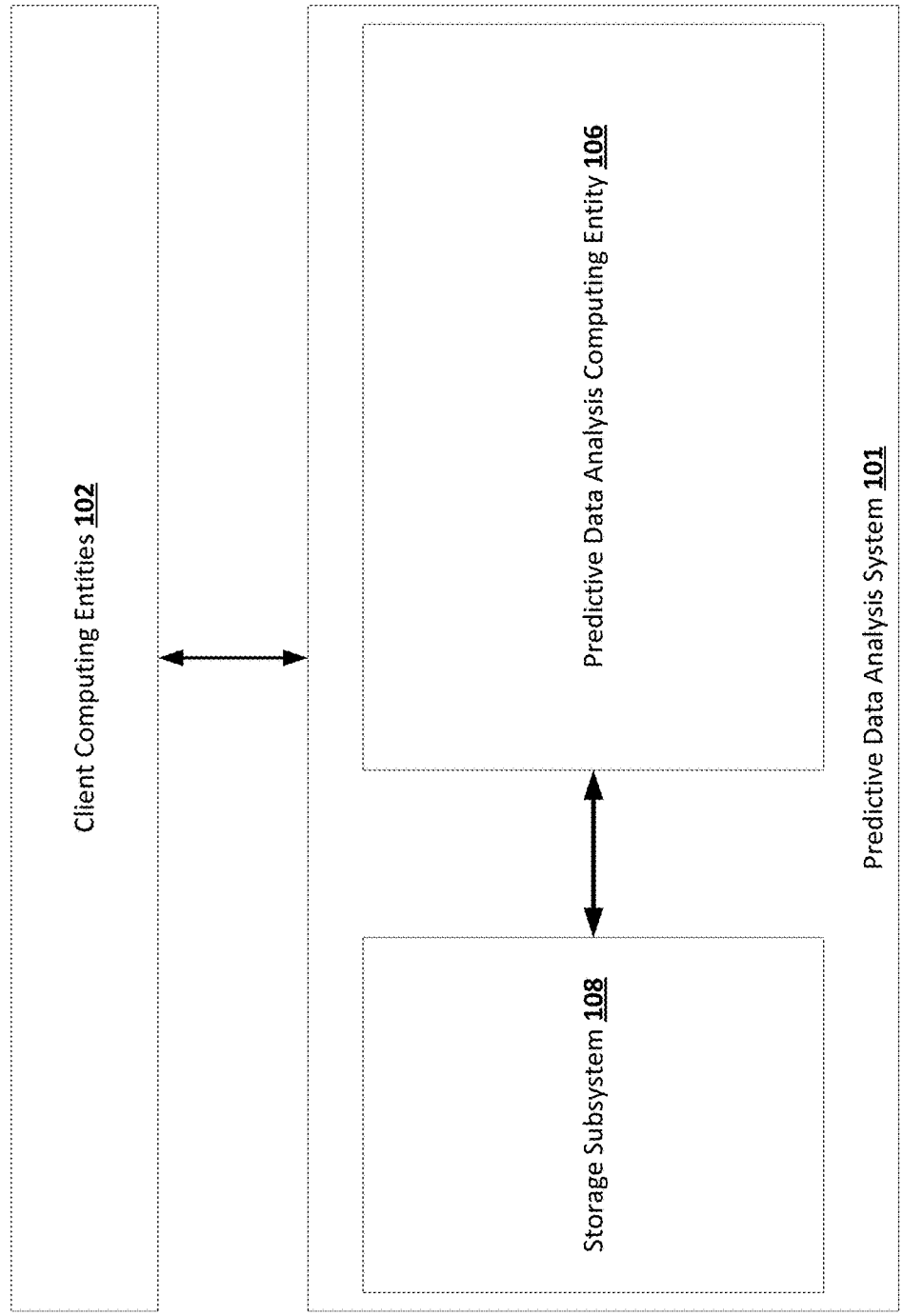

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
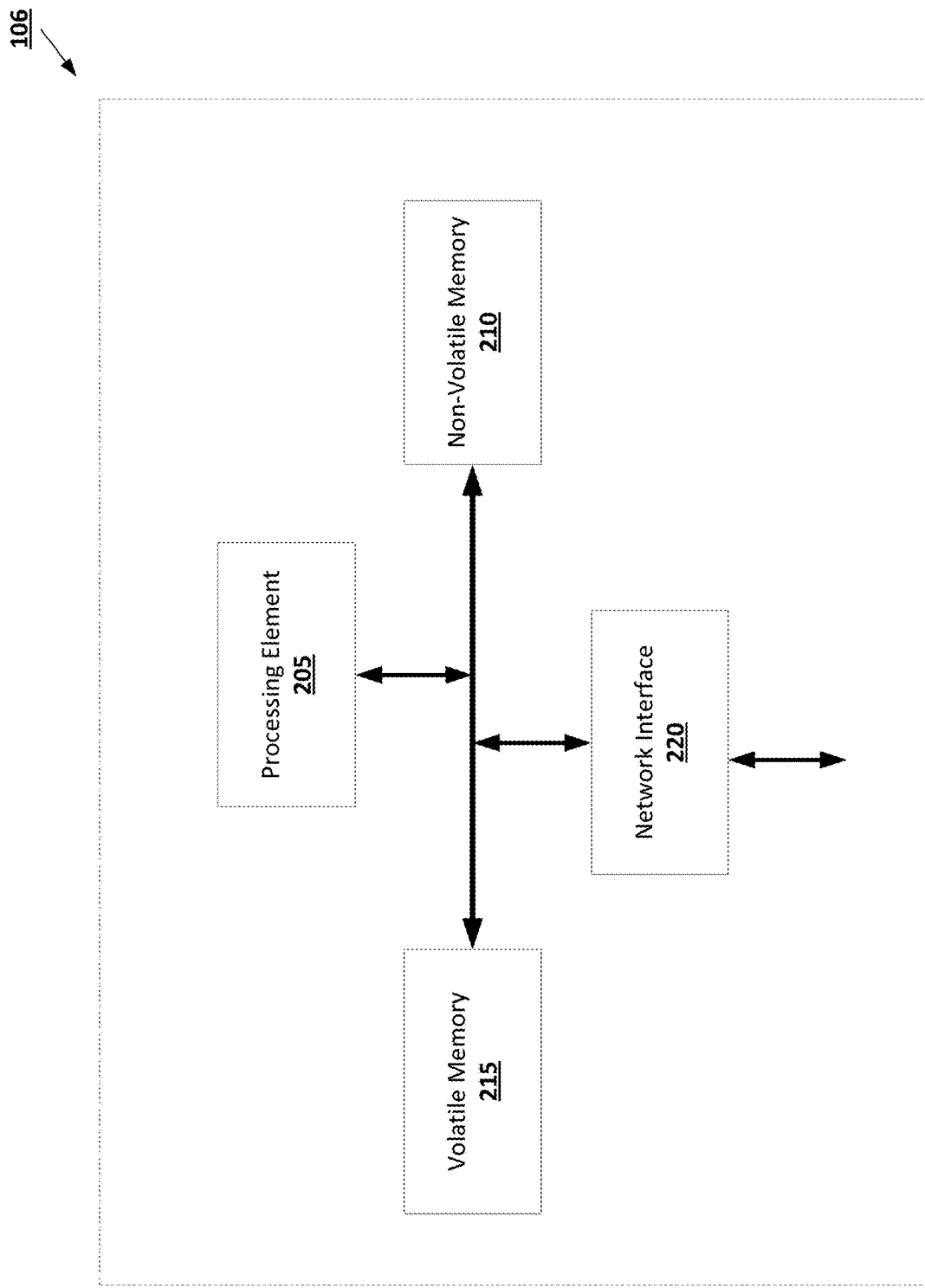

FIG. 2 provides an example predictive data analysis computing entity in accordance with some embodiments discussed herein.

Figure 3:
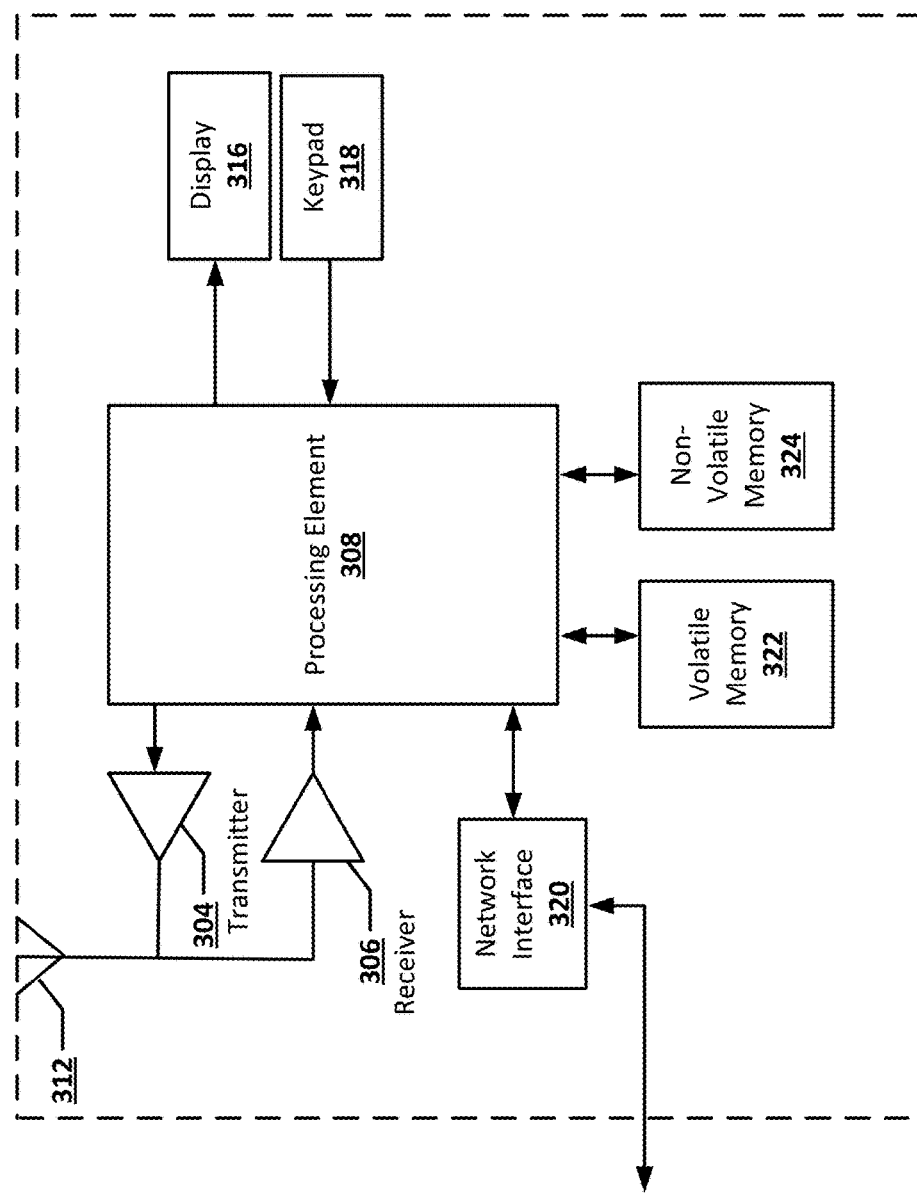

FIG. 3 provides an example client computing entity in accordance with some embodiments discussed herein.

Figure 4:
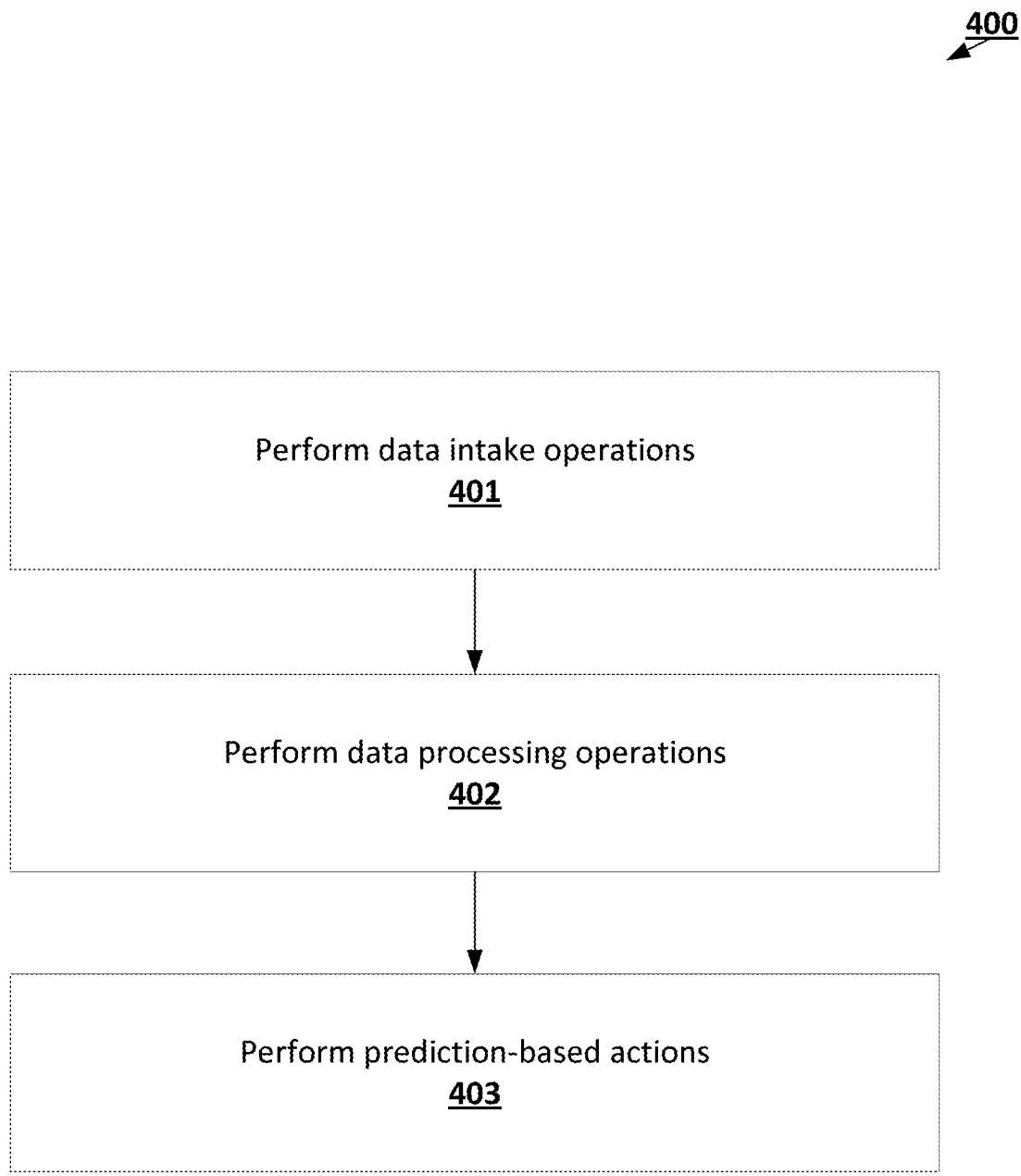

FIG. 4 is a flowchart diagram of an example process for performing temporally dynamic location-based predictive data analysis for a primary local-temporal pair data object associated with a primary locality data object and a primary temporal unit data object in accordance with some embodiments discussed herein.

Figure 5:

FIG. 5 provides an operational example of a locality list user interface in accordance with some embodiments discussed herein.

Figure 6:
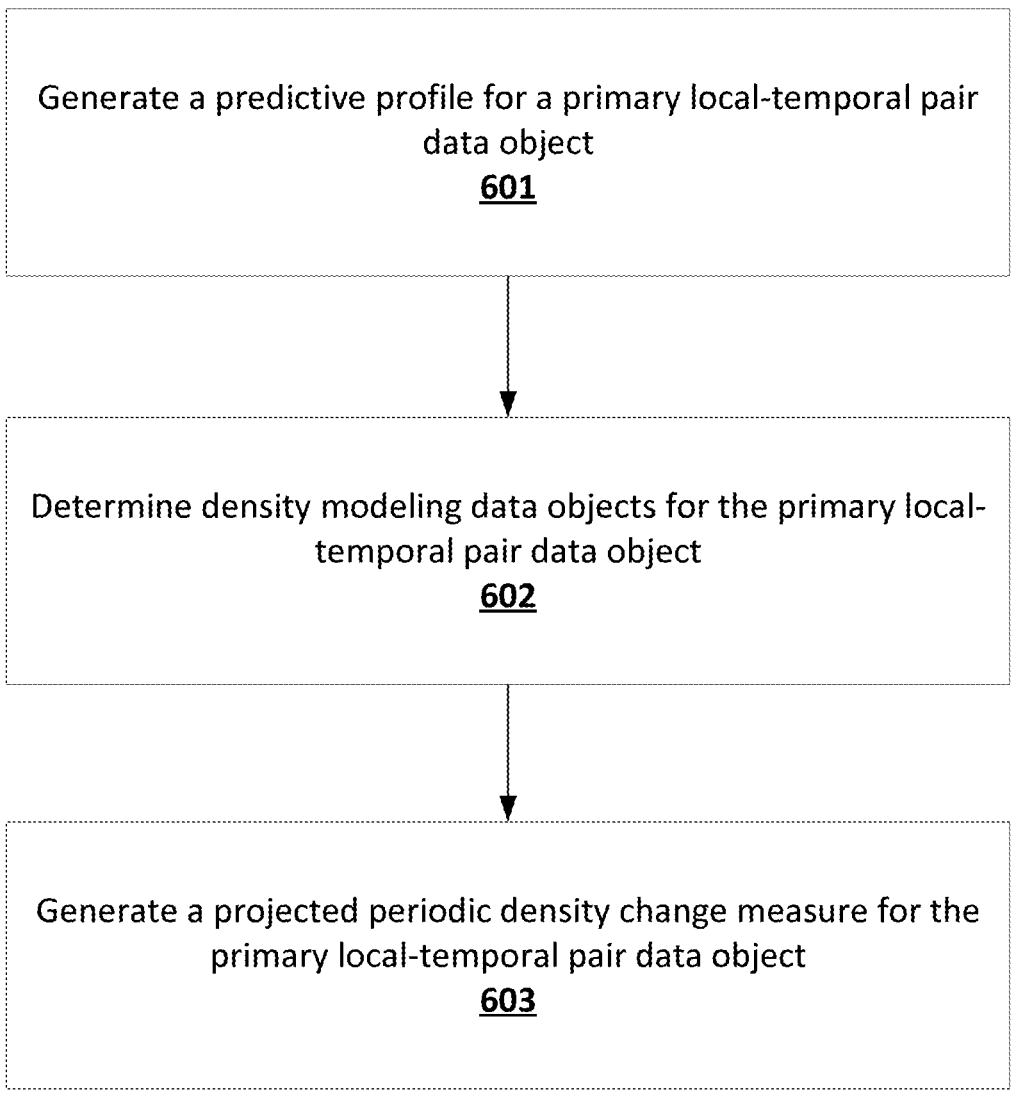

FIG. 6 is a flowchart diagram of an example process for performing one or more data processing operations on the group of disease-spread-related data objects to generate a projected periodic density change measure for a primary local-temporal pair data object in accordance with some embodiments discussed herein.

Figure 7:
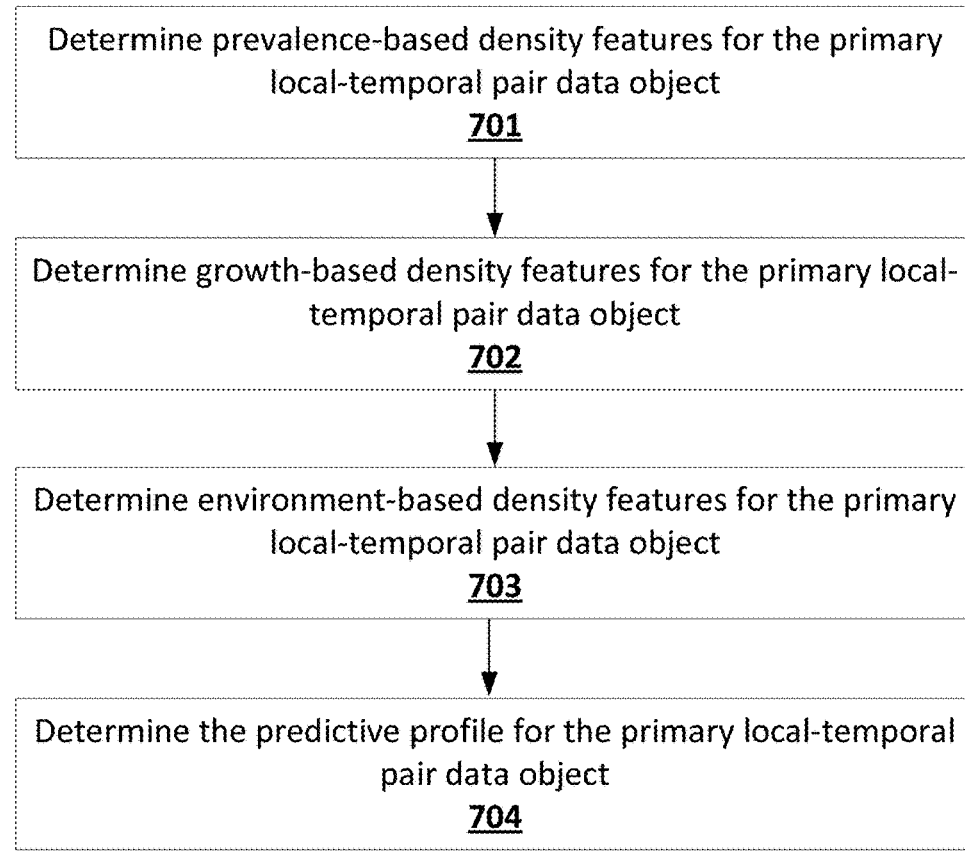

FIG. 7 is a flowchart diagram of an example process for generating a predictive profile for a primary local-temporal pair data object in accordance with some embodiments discussed herein.

Figure 8:
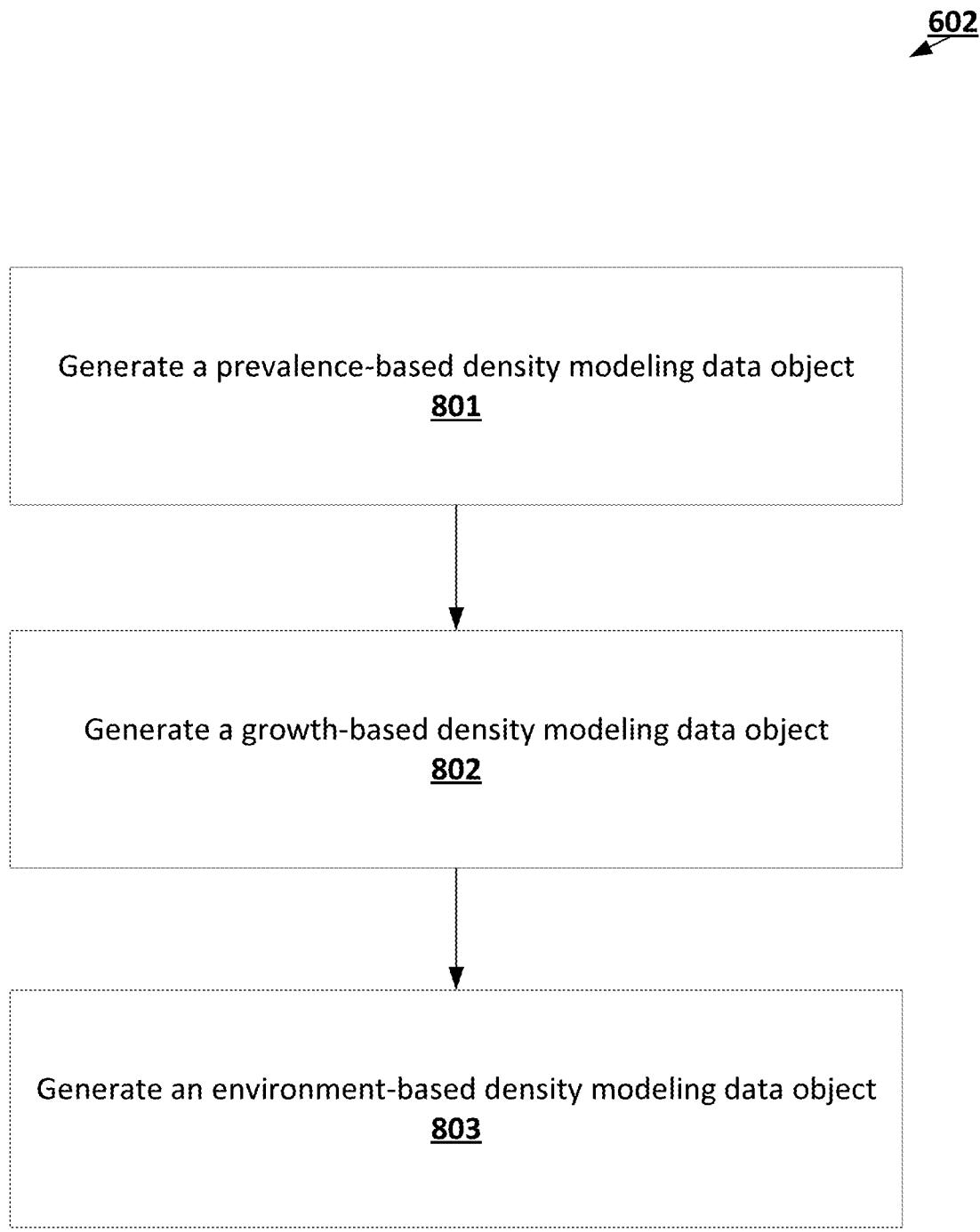

FIG. 8 is a flowchart diagram of an example process for generating a set of density modeling data objects for a primary local-temporal pair data object in accordance with some embodiments discussed herein.

Figure 9:
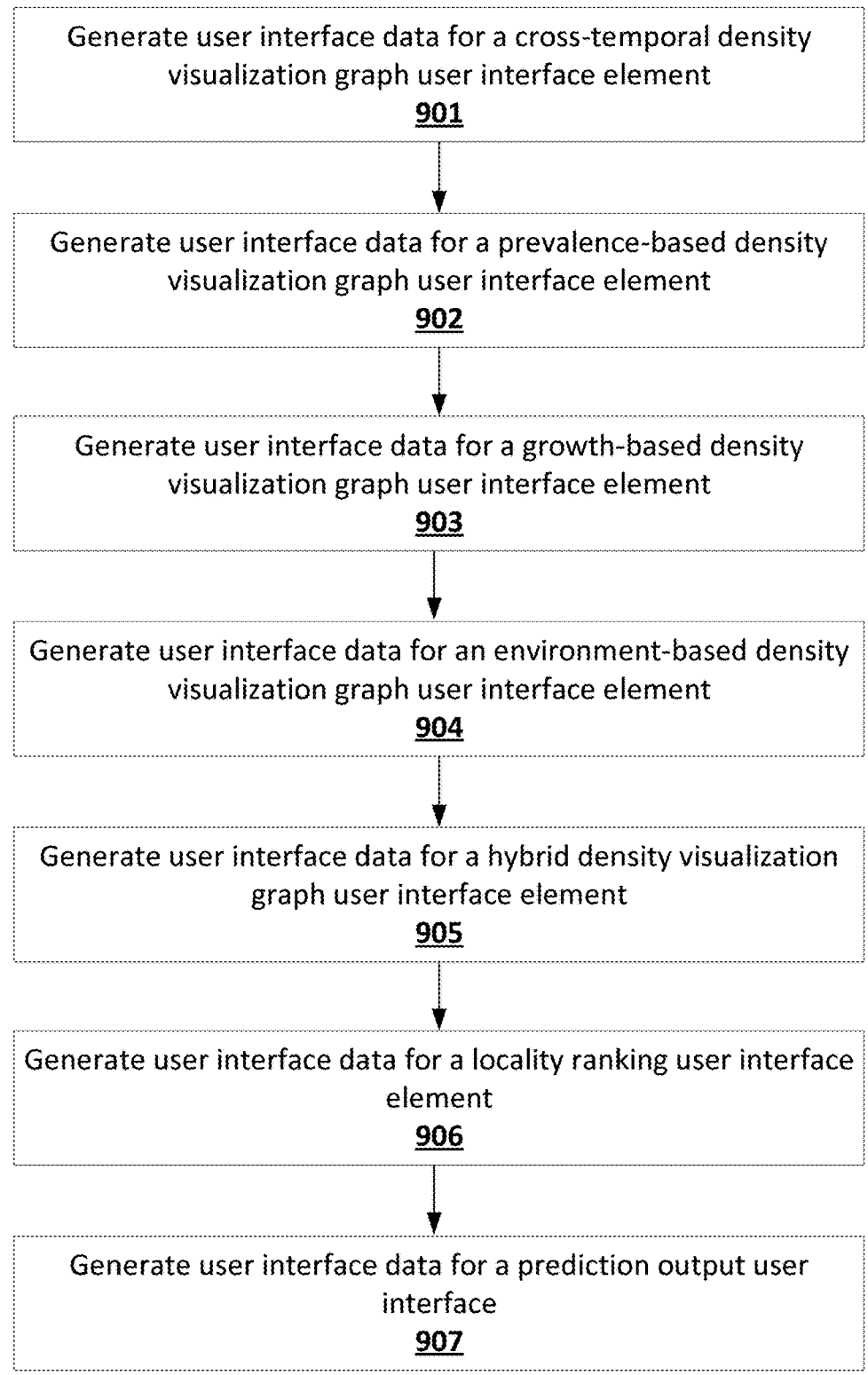

FIG. 9 is a flowchart diagram of an example process for performing prediction-based actions based at least in part on a projected periodic density change measure for a primary local-temporal pair data object in accordance with some embodiments discussed herein.

Figure 10:
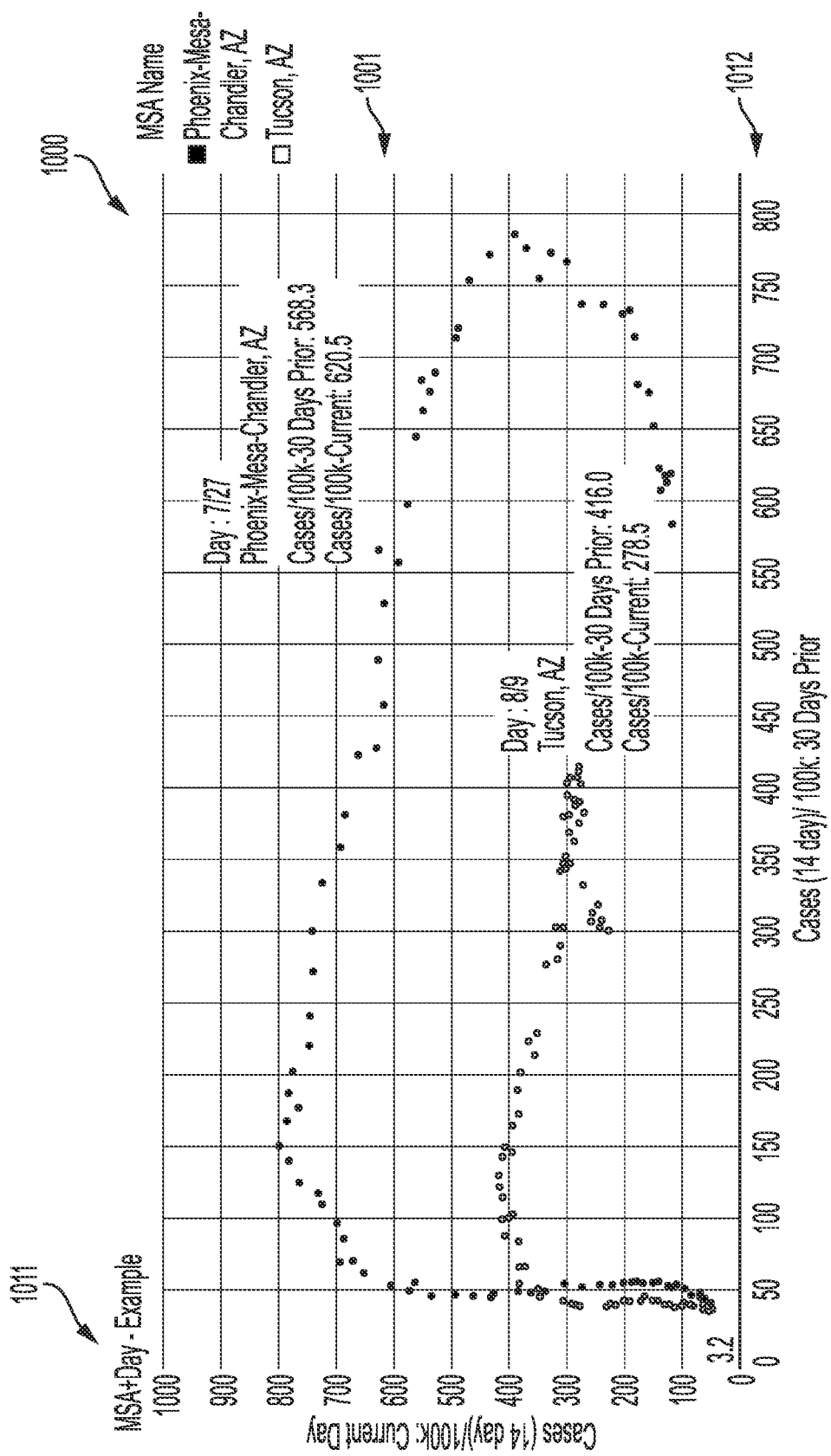

FIG. 10 provides an operational example of a prediction output user interface that includes a cross-temporal density visualization graph user interface element in accordance with some embodiments discussed herein.

Figure 11:
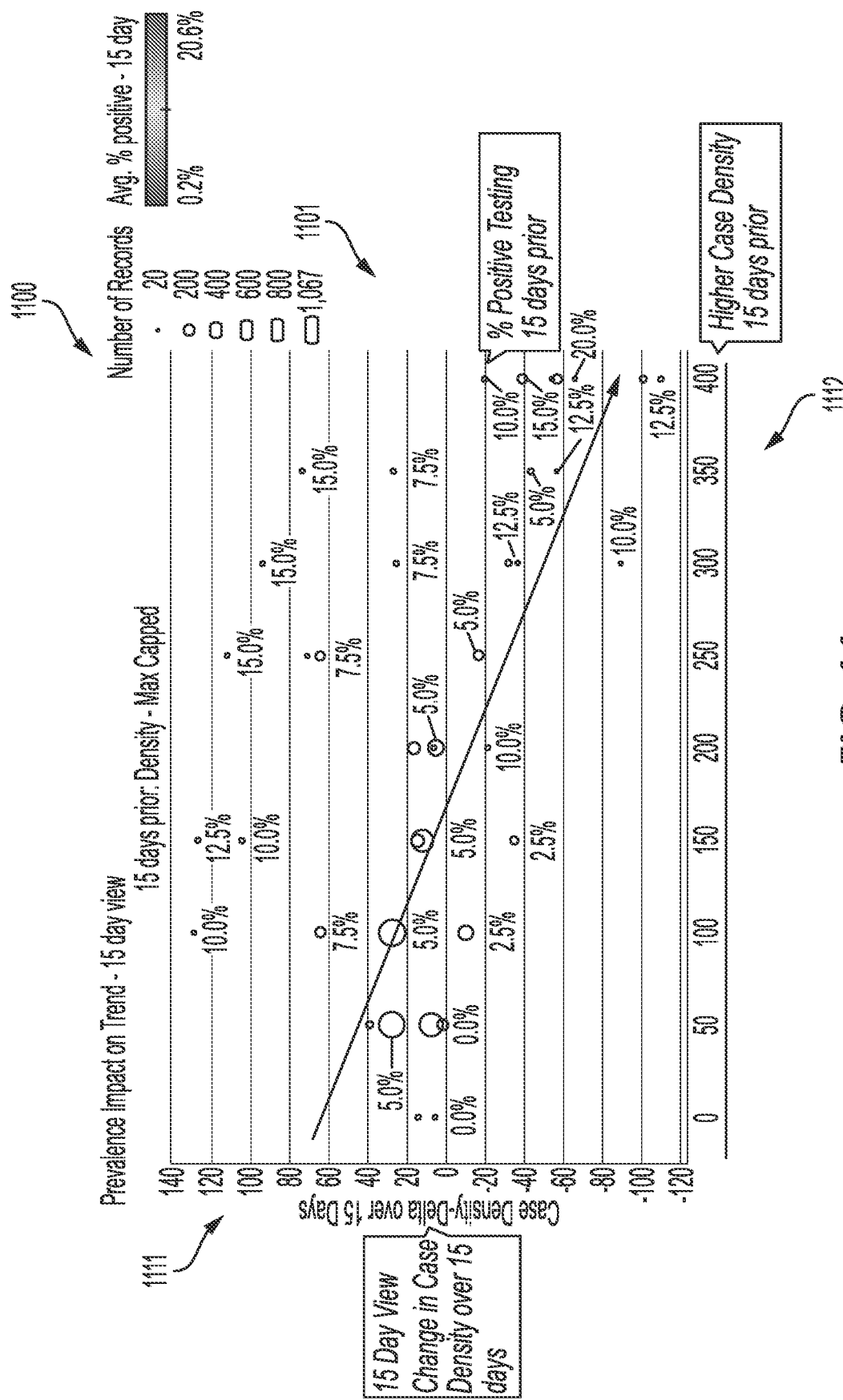

FIG. 11 provides an operational example of a prediction output user interface that includes a prevalence-based density visualization graph user interface element in accordance with some embodiments discussed herein.

Figure 12:
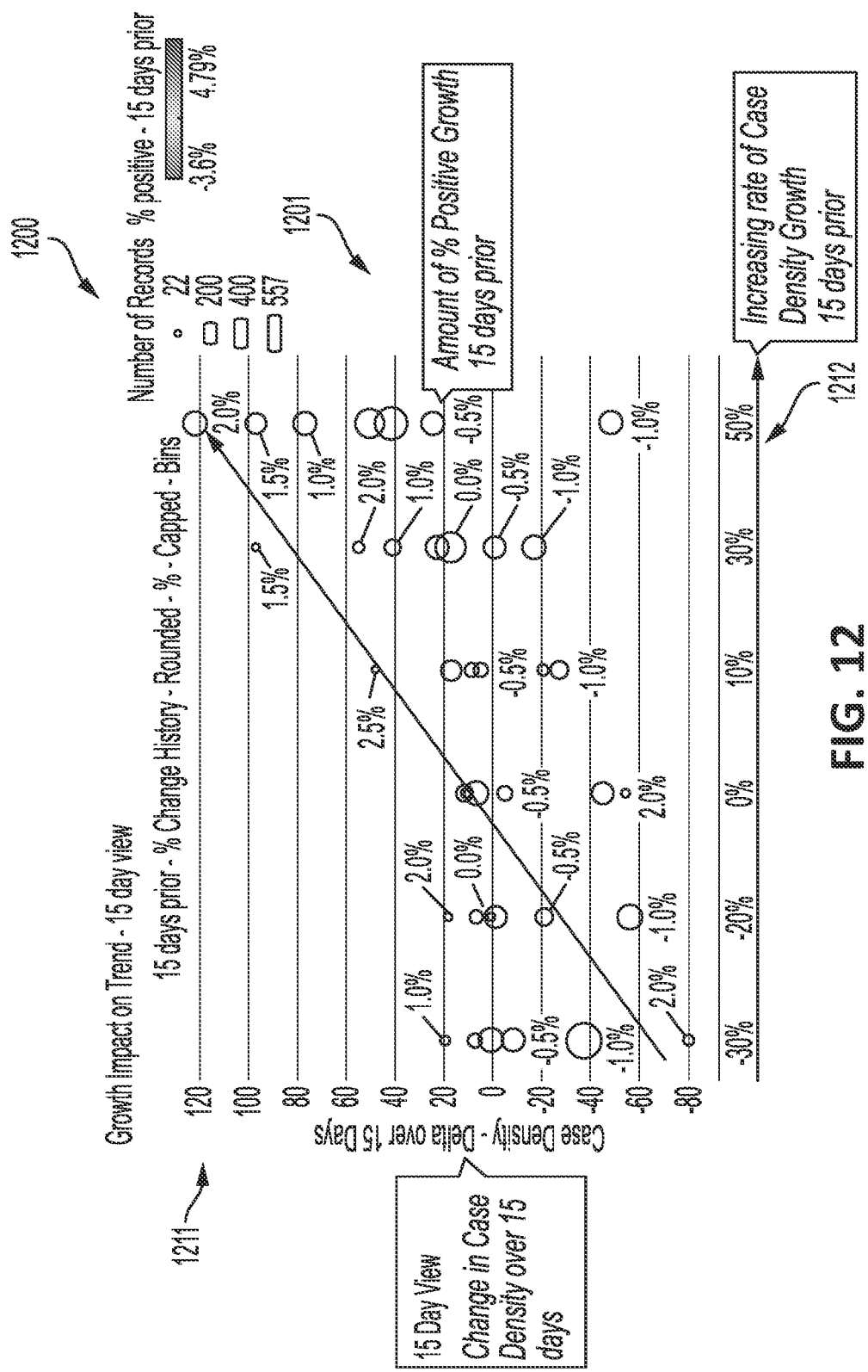

FIG. 12 provides an operational example of a prediction output user interface that includes a growth-based density visualization graph user interface element in accordance with some embodiments discussed herein.

Figure 13:
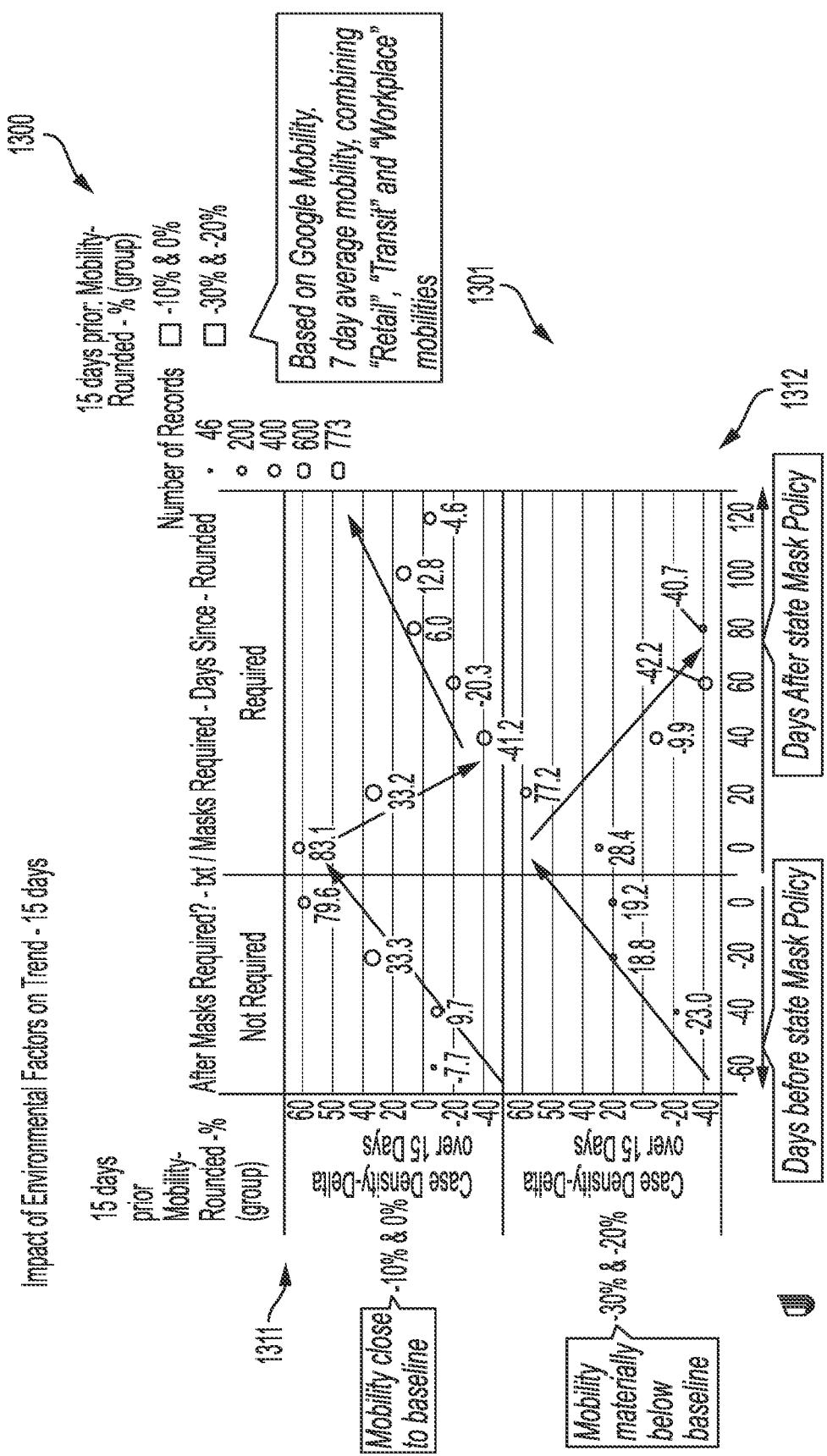

FIG. 13 provides an operational example of a prediction output user interface that includes an environment-based density visualization graph user interface element in accordance with some embodiments discussed herein.

Figure 14A:
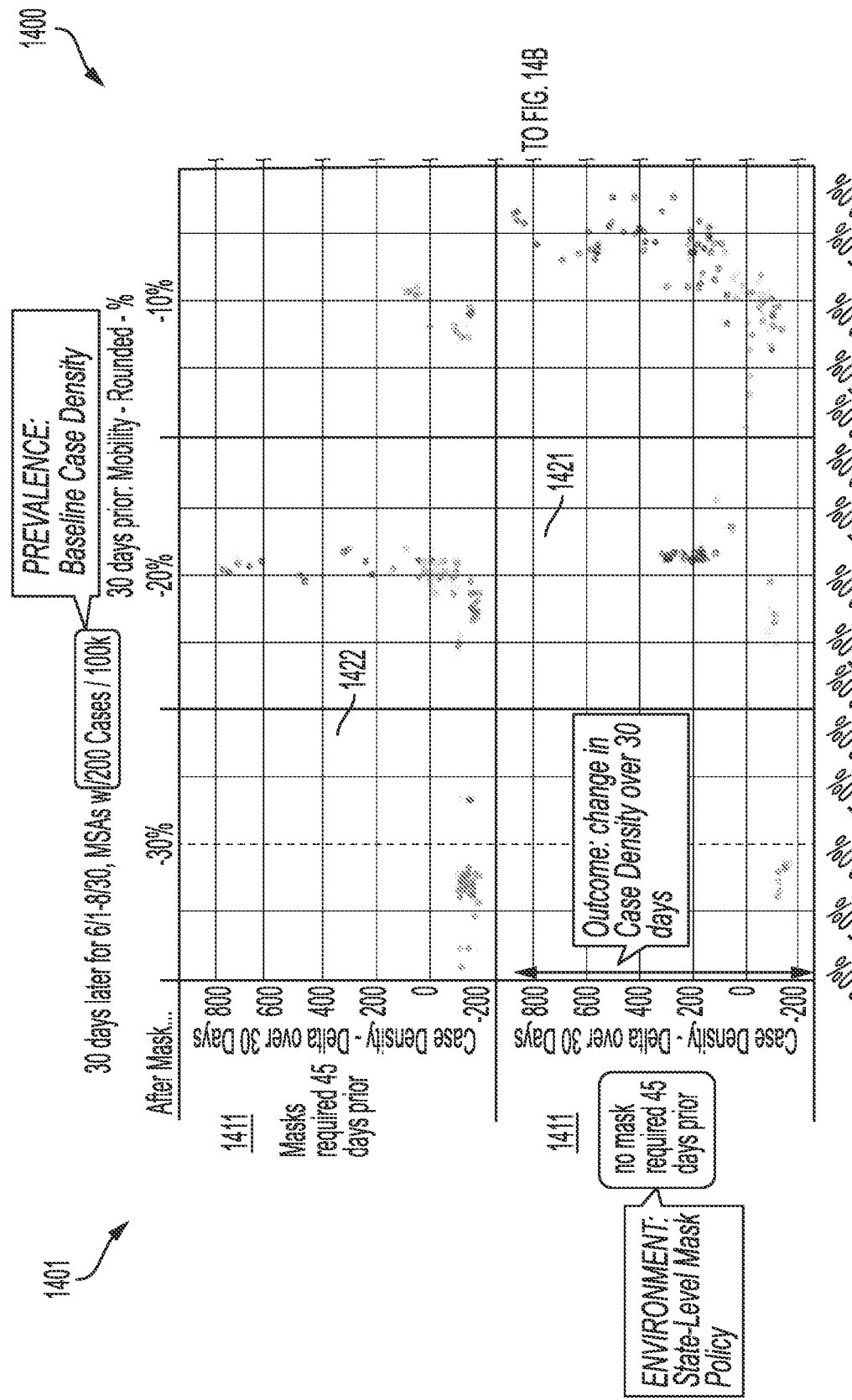
Figure 14B:
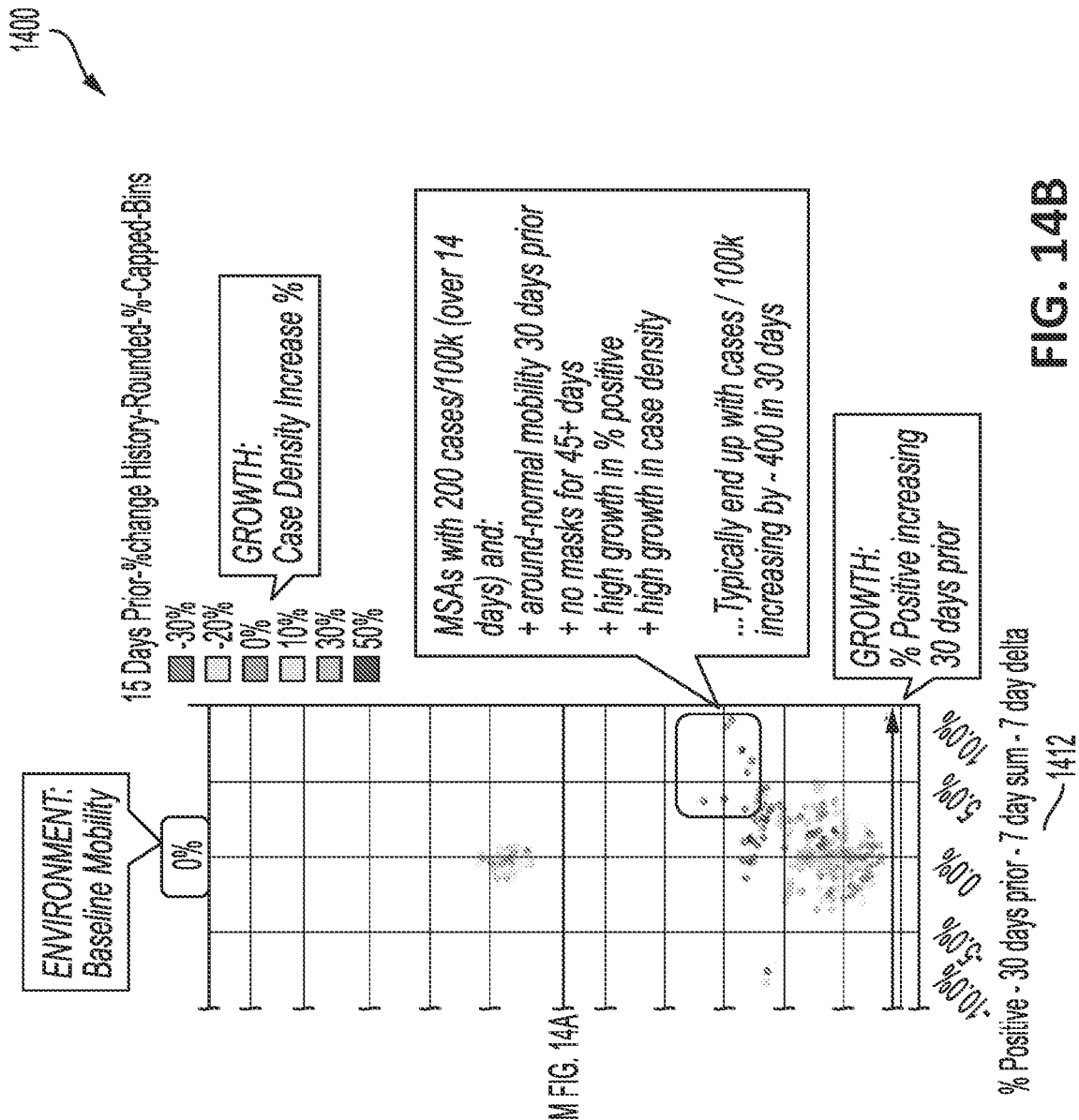

FIGS. 14A and 14B ("FIG. 14") provide an operational example of a prediction output user interface that includes an environment-based density visualization graph user interface element in accordance with some embodiments discussed herein.

FIGS. 15A, 15B, and 15C ("FIG. 15") provide operational examples of a prediction output user interface that includes a hybrid density visualization graph user interface element in accordance with some embodiments discussed herein.

Figure 16A:
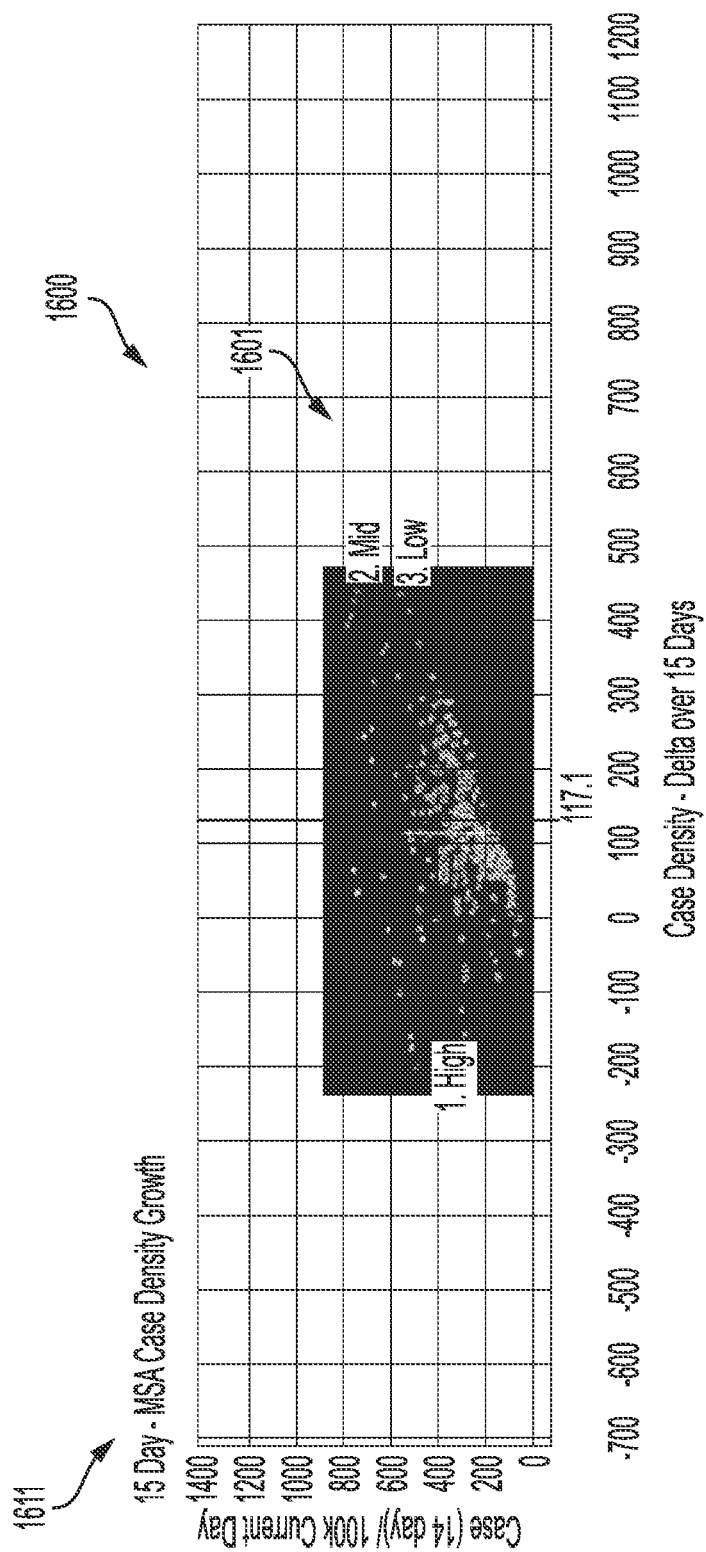
Figure 16B:
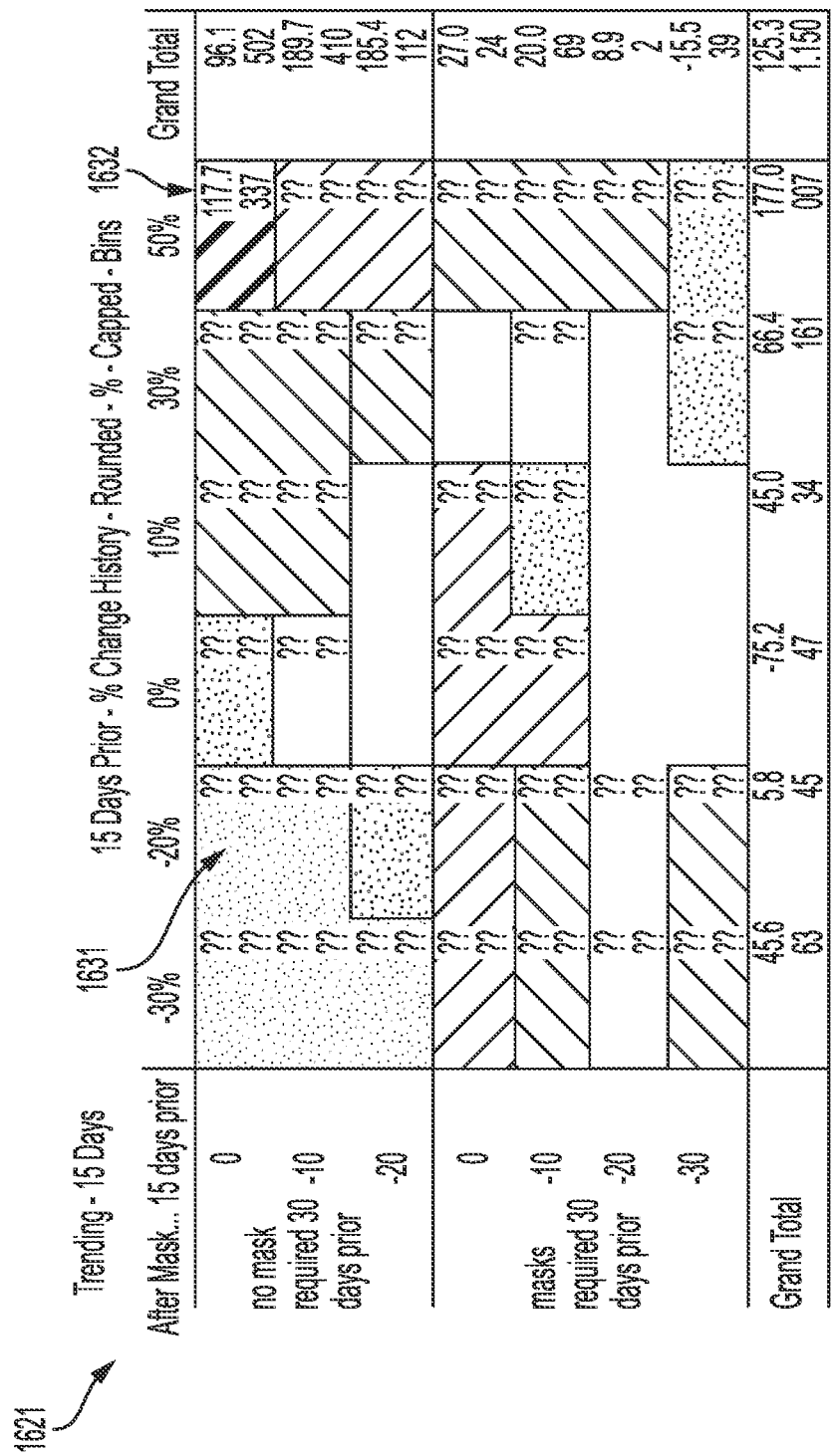

FIGS. 16A, 16B, and 16C ("FIG. 16") provide operational examples of a prediction output user interface that includes a locality ranking user interface element in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Improvements

Various embodiments of the present invention address technical challenges related to efficiency of performing cross-temporal location-based predictive data analysis. Various existing location-based predictive data analysis solutions suffer from substantial efficiency challenges resulting from the large number of location data objects that they need to process in order to generate predictive inferences. In contrast, various embodiments of the present invention utilize locality cohorts determined based at least in part on predictive profiles to reduce the number of cross-temporal predictive data analysis operations that are performed to generate a cross-temporal prediction, thus in turn improving the computational efficiency of performing temporally dynamic location-based predictive data analysis operations that should be performed in order to generate cross-temporal predictions for input locality data objects with respect to input control policy data objects. In doing so, various embodiments of the present invention reduce the computational load of performing cross-temporal location-based predictive data analysis, reduce the amount of storage resources needed to perform cross-temporal location-based predictive data analysis, and make important technical contributions to the field of cross-temporal location-based predictive data analysis.

An exemplary application of various embodiments of the present invention relates to identifying effectiveness of disease control policies based at least in part on cross-location inferences. For example, various embodiments of the present invention generate projected periodic density growth measures by performing one or more temporally dynamic location-based predictive data analysis operations by utilizing at least one of prevalence-based density modeling data objects, growth-based density modeling data objects, and environment-based density modeling data objects. In some embodiments, various embodiments of the present invention are configured to make predictions about the projected trend of disease growth in a target locality in response to adaptation of a particular disease control policy based at least in part on observed density change measures in localities deemed related to a particular locality, where correlations between localities may be determined based at least in part on at least one of prevalence-based disease density features across localities, growth-based disease density features across localities, and environment-based disease density features across localities.

II. Definitions

The term "locality data object" may refer to a data entity that is configured to describe a locality (e.g., a spatial unit, a geographic unit, an administrative division unit, and/or the like) with respect to which one or more predictive data analysis operations may be performed. For example, in some embodiments, a locality data object may describe a geographic unit (e.g., a city, state, province, country, and/or the like) with respect to which one or more predictive data analysis operations may be performed in order to generate a disease spread prediction (e.g., a disease growth rate prediction) for the geographic unit. In some of the noted embodiments, the disease spread prediction for a geographic unit may describe a projected periodic density change measure for a corresponding disease in the geographic union at a particular temporal unit. For example, in some embodiments, a disease spread prediction for a geographic unit may describe a projected periodic density change measure for a corresponding disease in the geographic unit for each day of n days after an assumed adoption of a particular disease spread control policy in the geographic unit with respect to the corresponding disease. A locality data object may be an atomic value or an array of values.

The term "temporal unit data object" may refer to a data entity that is configured to describe a temporal unit (e.g., a day, a week, a month, and/or the like) with respect to which one or more predictive data analysis operations may be performed. For example, in some embodiments, a temporal unit data object may describe a temporal unit (e.g., a day, a week, a month, and/or the like) with respect to which one or more predictive data analysis operations may be performed in order to generate a disease spread prediction (e.g., a disease growth rate prediction) for the temporal unit. In some of the noted embodiments, the disease spread prediction for a temporal unit may describe a projected periodic density change measure for a corresponding disease at the temporal unit in a particular geographic unit. For example, in some embodiments, a disease spread prediction for a temporal unit may describe a projected periodic density change measure for a corresponding disease at the temporal unit as defined based at least in part on a number of days after an assumed adoption of a particular disease spread control policy in a geographic unit with respect to the corresponding disease. A temporal unit data object may be an atomic value or an array of values.

The term "temporal-local pair data object" may refer to a data entity that is configured to describe the combination of a locality data object and a temporal unit data object with respect to which one or more predictive data analysis operations may be performed. Various embodiments of the present invention may be configured to generate disease spread predictions (e.g., projected periodic density change measures) for combinations of localities at particular temporal units. Accordingly, in some embodiments, disease spread predictions are generated for local-temporal pair data objects, where each local-temporal pair data object is associated with a locality data object defining a locality and a temporal unit data object defining a temporal unit. A local-temporal pair data object may be an atomic value or an array of values.

The term "disease-spread-related data object" may refer to a data entity that is configured to describe one or more data fields associated with spread of a particular disease, such as one or more data fields associated with a number of active infection cases for the particular disease for a locality data object at a particular unit of time, one or more data fields associated with a number of reported deaths resulting from the particular disease for a locality data object at a particular unit of time, one or more data fields associated with adoption of control policy data objects associated with a locality data object at a particular unit of time, one or more data fields associated with locality sentiment designations for particular locality data objects with respect to particular control policy data objects, one or more data fields associated with locality adherence designations for particular locality data objects with respect to particular control policy data objects, one or more data fields associated with demographic features for particular locality data objects, and/or the like. For example, in some embodiments, a disease-spread-related data object may describe, for each locality data object of group of locality data objects describing a locality, at least one of the following: (i) one or more infectious disease counts for the locality with respect to a particular disease across a number of temporal units (e.g., a number of days); (ii) one or more disease-induced death counts for the locality with respect to the particular disease across the number of temporal units; (iii) one or more control policy data objects for the locality each describing a control policy adopted by the locality; (iv) for each control policy data object associated with the locality: (a) an adoption timestamp describing a temporal unit (e.g., a day) in which the corresponding control policy is adopted, (b) a locality sentiment designation for the locality data object with respect to the control policy data object, and (c) a locality adherence designation for the locality data object with respect to the control policy data object; and (v) one or more demographic features of the locality (e.g., a population count of the locality, a density measure for the locality, a sprawl measure for the locality, a mobility measure for the locality, and/or the like). Other examples of data that may be described by disease-spread-related data objects include: masking related data (e.g., Masks4all data, and/or the like), social media data (e.g., Twitter data, and/or the like), case count data (e.g., Worldometer data, USAFacts data, and/or the like), lab testing data (e.g. state reported data such as data reported via ca.gov), tourism spending data (e.g., ustravel.org data), state-based gross domestic product (GDP) data (e.g., bea.gov data), mobility data, applicable jurisdiction-based policy anchor points (e.g., retrieved via county or state department of health websites), and other environmental information as applicable (e.g., sentiment information gathered from non-social media sources such as surveys).

The term "predictive profile" may refer to a data entity that is configured to describe a set of features related to a projected density of a corresponding disease in a locality data object associated with a local-temporal pair data object at a corresponding temporal unit data object associated with the local-temporal pair data object. For example, the predictive profile for a local-temporal pair data object may be configured to describe at least one of the following: one or more prevalence-based density features for the primary local-temporal pair data object, one or more growth-based density features for the primary local-temporal pair data object, and one or more environment-based density features for the primary local-temporal pair data object. As further described below, the predictive profile for a local-temporal pair data object may be used to generate a subset of other local-temporal pair data objects that are deemed to be related to the particular local-temporal pair data object.

The term "prevalence-based density feature" may refer to a data entity that is configured to describe a feature related to density of a disease in a locality data object associated with a local-temporal pair data object at a temporal unit data object associated with the local-temporal pair data object. Examples of prevalence-based density features for a local-temporal pair data object include: a current prevalence density measure that describes a measure of a number of infection cases for a disease in a locality data object associated with the local-temporal pair data object at a temporal unit data object associated with the local-temporal pair data object (e.g., sum of infection cases over the last 14 days per 100 thousands of people in a locality for a current day), a historical prevalence density measure that describes a measure of a number of infection cases for a disease in a locality data object associated with the local-temporal pair data object at historical time period related to a temporal unit data object associated with the local-temporal pair data object (e.g., average, over the last 30 historical days, of sums of cases over the last 14 days per 100 thousands of people in a geographic unit for the last 30 days per historical day), a current hospitalization prevalence density measure that describes a measure of a number of hospitalization cases for a disease in a locality data object associated with the local-temporal pair data object at a temporal unit data object associated with the local-temporal pair data object (e.g., sum of hospitalization cases over the last 14 days per 100 thousands of people in a locality for a current day), a current social media activity prevalence density measure that describes a measure of a number of affirmative social media activity cases for a disease in a locality data object associated with the local-temporal pair data object at a temporal unit data object associated with the local-temporal pair data object (e.g., sum of affirmative social medic activity cases over the last 14 days per 100 thousands of people in a locality for a current day), a current temperature prevalence density measure that describes a measure of a number of affirmative temperature-based detection cases for a disease in a locality data object associated with the local-temporal pair data object at a temporal unit data object associated with the local-temporal pair data object (e.g., sum of affirmative temperature-based detection cases over the last 14 days per 100 thousands of people in a locality for a current day), a periodic positive test change measure that describe a change in the ratio of affirmative test results for a disease in a locality data object associated with the local-temporal pair data object within a time period that is associated with the temporal unit data object for the local-temporal pair data object (e.g., a positive test change percentage for the last 15 days associated with the corresponding local-temporal pair data object), a periodic positive test measure that describe a ratio of affirmative test results for a disease in a locality data object associated with the local-temporal pair data object within a time period that is associated with the temporal unit data object for the local-temporal pair data object (e.g., a positive test percentage for the last 15 days associated with the corresponding local-temporal pair data object), and/or the like.

The term "growth-based density feature" may refer to a data entity that is configured to describe a feature related to change in density of a disease in a locality data object associated with a local-temporal pair data object at a temporal unit data object associated with the local-temporal pair data object. Examples of growth-based density features for a local-temporal pair data object include: a current prevalence density growth rate measure that describes a measure of a change in a number of infection cases for a disease in a locality data object associated with the local-temporal pair data object at a temporal unit data object associated with the local-temporal pair data object (e.g., a change in a sum of infection cases over the last 14 days per 100 thousands of people in a locality for a current day), a current hospitalization prevalence density growth rate measure that describes a change in a measure of a number of hospitalization cases for a disease in a locality data object associated with the local-temporal pair data object at a temporal unit data object associated with the local-temporal pair data object (e.g., a change in a sum of hospitalization cases over the last 14 days per 100 thousands of people in a locality for a current day), a current social media activity prevalence density growth rate measure that describes a change in a measure of a number of affirmative social media activity cases for a disease in a locality data object associated with the local-temporal pair data object at a temporal unit data object associated with the local-temporal pair data object (e.g., a change in sum of affirmative social medic activity cases over the last 14 days per 100 thousands of people in a locality for a current day), a current temperature prevalence density growth rate measure that describes a change in a measure of a number of affirmative temperature-based detection cases for a disease in a locality data object associated with the local-temporal pair data object at a temporal unit data object associated with the local-temporal pair data object (e.g., a change in a sum of affirmative temperature-based detection cases over the last 14 days per 100 thousands of people in a locality for a current day), a periodic positive test change measure that describe a change in the ratio of affirmative test results for a disease in a locality data object associated with the local-temporal pair data object within a time period that is associated with the temporal unit data object for the local-temporal pair data object (e.g., a positive test change percentage for the last 15 days associated with the corresponding local-temporal pair data object), a periodic positive test measure that describe a ratio of affirmative test results for a disease in a locality data object associated with the local-temporal pair data object within a time period that is associated with the temporal unit data object for the local-temporal pair data object (e.g., a positive test percentage for the last 15 days associated with the corresponding local-temporal pair data object), and/or the like.

The term "environment-based density feature" may refer to a data entity that is configured to describe at least one of the following: (i) a feature related to one or more social control policies (e.g., mask requirements policies) in place at a locality data object associated with a local-temporal pair data object during a temporal unit data object associated with the local-temporal pair data object, (ii) a feature related to detected population mobility patterns at a locality data object associated with the local-temporal pair data object during a temporal unit data object associated with the local-temporal pair data object, and (iii) a feature related to detected population sprawl patterns at a locality data object associated with the local-temporal pair data object during a temporal unit data object associated with the local-temporal pair data object. Examples of environment-based density features for a local-temporal pair data object include: a control policy temporal offset that describes how many days before or after a temporal unit data object associated with the local-temporal pair data object a disease control policy (e.g., a mask mandate) was imposed on a locality data object associated with the local-temporal data object, a periodic mobility measure that describes a detected mobility rate of a population (e.g., as inferred based at least in part on data reported by a global positioning system (GPS) software application such as Google Maps) of a locality data object associated with the local-temporal pair data object during a temporal unit data object associated with the local-temporal pair data object, features related to county-level mask requirements at a locality data object associated with the local-temporal pair data object during a temporal unit data object associated with the local-temporal pair data object, features related to back-to-school policies at a locality data object associated with the local-temporal pair data object during a temporal unit data object associated with the local-temporal pair data object, features related to lockdown restrictions at a locality data object associated with the local-temporal pair data object during a temporal unit data object associated with the local-temporal pair data object, features related to survey data for a locality data object associated with the local-temporal pair data object during a temporal unit data object associated with the local-temporal pair data object, features related to social media aggregation patterns for a locality data object associated with the local-temporal pair data object during a temporal unit data object associated with the local-temporal pair data object, features related to observed political leanings of a locality data object associated with the local-temporal pair data object during a temporal unit data object associated with the local-temporal pair data object and/or the like.

The term "density modeling data object" may refer to a data entity that is configured to describe a data object that relates one or more density features (e.g., one or more prevalence-based density features, one or more growth-based density features, and/or one or more environment-based density features) for each local-temporal pair data object of a group of local-temporal pair data objects (e.g., a group of local-temporal pair data objects having the same predictive profile as a primary local-temporal pair data object) to a disease spread prediction for the local-temporal pair data object (e.g., to a periodic density change measure for the local-temporal pair data object). Examples of density modeling data objects include prevalence-based density modeling data objects, growth-based density modeling data objects, and environment-based density modeling data objects.

The term "prevalence-based density modeling data object" may refer to a data entity that is configured to describe a density modeling data object that relates each current periodic density measure of a local-temporal pair data object of a group of local-temporal pair data objects (e.g., a group of local-temporal pair data objects having the same predictive profile as a primary local-temporal pair data object) to a disease spread prediction for the local-temporal pair data object (e.g., to a periodic density change measure for the local-temporal pair data object). For example, the prevalence-based density modeling data object may relate each predictive profile current periodic density measure for a predictive profile local-temporal pair data object of the one or more predictive profile local-temporal pair data objects to a predictive profile periodic density change measure for the predictive profile local-temporal pair data object. The prevalence-based density modeling data object may further describe, for each local-temporal pair data object of the group of local-temporal pair data objects, a measure of a total number of records associated with the local-temporal pair data object and a periodic positive test change measure associated with the local-temporal pair data object.

The term "growth-based density modeling data object" may refer to a data entity that is configured to describe a density modeling data object that relates each predictive profile periodic density growth rate measure of a local-temporal pair data object of a group of local-temporal pair data objects (e.g., a group of local-temporal pair data objects having the same predictive profile as a primary local-temporal pair data object) to a disease spread prediction for the local-temporal pair data object (e.g., to a periodic density change measure for the local-temporal pair data object). For example, the growth-based density modeling data object may relate each predictive profile periodic density growth rate measure for a predictive profile local-temporal pair data object of the one or more predictive profile local-temporal pair data objects to a predictive profile periodic density change measure for the predictive profile local-temporal pair data object. The growth-based density modeling data object may further describe, for each local-temporal pair data object of the group of local-temporal pair data objects, a measure of a total number of records associated with the local-temporal pair data object and a periodic positive test change measure associated with the local-temporal pair data object.

The term "environment-based density modeling data object" may refer to a data entity that is configured to describe a density modeling data object that relates each control policy temporal offset measure of a local-temporal pair data object of a group of local-temporal pair data objects (e.g., a group of local-temporal pair data objects having the same predictive profile as a primary local-temporal pair data object) to a disease spread prediction for the local-temporal pair data object (e.g., to a periodic density change measure for the local-temporal pair data object). For example, the environment-based density modeling data object may relate each predictive profile control policy offset measure for a predictive profile local-temporal pair data object of the one or more predictive profile local-temporal pair data objects to a predictive profile periodic density change measure for the predictive profile local-temporal pair data object. The environment-based density modeling data object may further describe, for each local-temporal pair data object of the group of local-temporal pair data objects, a periodic mobility measure for the corresponding local-temporal pair data object and a grouping of the local-temporal pair data object that describes a subrange of the periodic mobility measure for the local-temporal pair data object in a total range of periodic mobility measures for all local-temporal pair data objects.

The term "projected periodic density change measure" may refer to a data entity that is configured to describe a projected rate of change in a density measure for a disease at a locality data object associated with a corresponding local-temporal pair data object during a temporal unit data object associated with the corresponding local-temporal pair data object, where the projected rate of change may be determined based at least in part on performing predictive data analysis operations using rates of changes of density measures for the disease at other local-temporal pair data objects (e.g., other local-temporal-temporal data objects that are deemed related to the primary local-temporal pair data object). In some embodiments, to generate the projected periodic density measure for the primary local-temporal pair data object, a predictive data analysis computing entity performs one or more pattern matching operations across the one or more density modeling data objects to determine distances between the predictive profile local-temporal pair data objects and the primary local-temporal pair data object in accordance with the density features for the predictive profile local-temporal pair data objects as described by density modeling data objects and the density features for the primary local-temporal pair data object, adjusts each periodic density change measure for a predictive profile local-temporal pair data object based at least in part on the determined distance for the predictive profile local-temporal pair data object, and combines the adjusted periodic density change measures for the predictive profile local-temporal pair data objects to generate the projected periodic density measure for the primary local-temporal pair data object.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specificallyconfigured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is a request for generating a prediction output user interface that depict one or more outputs of one or more temporally dynamic location-based predictive data analysis operations for an input locality data object, as further described below.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of an client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention address technical challenges related to efficiency of performing cross-temporal location-based predictive data analysis. Various existing location-based predictive data analysis solutions suffer from substantial efficiency challenges resulting from the large number of location data objects that they need to process in order to generate predictive inferences. In contrast, various embodiments of the present invention utilize locality cohorts determined based at least in part on predictive profiles to reduce the number of cross-temporal predictive data analysis operations that are performed to generate a cross-temporal prediction, thus in turn improving the computational efficiency of performing temporally dynamic location-based predictive data analysis operations that should be performed in order to generate cross-temporal predictions for input locality data objects with respect to input control policy data objects. In doing so, various embodiments of the present invention reduce the computational load of performing cross-temporal location-based predictive data analysis, reduce the amount of storage resources needed to perform cross-temporal location-based predictive data analysis, and make important technical contributions to the field of cross-temporal location-based predictive data analysis.

FIG. 4 is a flowchart diagram of an example process 400 for performing temporally dynamic location-based predictive data analysis for a primary local-temporal pair data object associated with a primary locality data object and a primary temporal unit data object. Via the various steps/operations of the process 400, the predictive data analysis computing entity 106 can efficiently and effectively utilize cross-geographic prevalence-based density inferences, cross-geographic growth-based density inferences, and cross-geographic environment-based density inferences to generate predictive insights related to a projected periodic density change measure for a primary local-temporal pair data object.

In general, a locality data object may describe a locality (e.g., a spatial unit, a geographic unit, an administrative division unit, and/or the like) with respect to which one or more predictive data analysis operations may be performed. For example, in some embodiments, a locality data object may describe a geographic unit (e.g., a city, state, province, country, and/or the like) with respect to which one or more predictive data analysis operations may be performed in order to generate a disease spread prediction (e.g., a disease growth rate prediction) for the geographic unit. In some of the noted embodiments, the disease spread prediction for a geographic unit may describe a projected periodic density change measure for a corresponding disease in the geographic union at a particular temporal unit. For example, in some embodiments, a disease spread prediction for a geographic unit may describe a projected periodic density change measure for a corresponding disease in the geographic unit for each day of n days after an assumed adoption of a particular disease spread control policy in the geographic unit with respect to the corresponding disease. A locality data object may be an atomic value or an array of values. An operational example of indications of a set of locality data objects is depicted in the locality list user interface 500 of FIG. 5.

Furthermore, a temporal unit data object may describe a temporal unit (e.g., a day, a week, a month, and/or the like) with respect to which one or more predictive data analysis operations may be performed. For example, in some embodiments, a temporal unit data object may describe a temporal unit (e.g., a day, a week, a month, and/or the like) with respect to which one or more predictive data analysis operations may be performed in order to generate a disease spread prediction (e.g., a disease growth rate prediction) for the temporal unit. In some of the noted embodiments, the disease spread prediction for a temporal unit may describe a projected periodic density change measure for a corresponding disease at the temporal unit in a particular geographic unit. For example, in some embodiments, a disease spread prediction for a temporal unit may describe a projected periodic density change measure for a corresponding disease at the temporal unit as defined based at least in part on a number of days after an assumed adoption of a particular disease spread control policy in a geographic unit with respect to the corresponding disease. A temporal unit data object may be an atomic value or an array of values.

Moreover, a local-temporal pair data object may describe the combination of a locality data object and a temporal unit data object with respect to which one or more predictive data analysis operations may be performed. Various embodiments of the present invention may be configured to generate disease spread predictions (e.g., projected periodic density change measures) for combinations of localities at particular temporal units. Accordingly, in some embodiments, disease spread predictions are generated for local-temporal pair data objects, where each local-temporal pair data object is associated with a locality data object defining a locality and a temporal unit data object defining a temporal unit. A local-temporal pair data object may be an atomic value or an array of values.

As described above, the process 400 may be configured to enable performing temporally dynamic location-based predictive data analysis for a primary local-temporal pair data object associated with a primary locality data object and a primary temporal unit data object. The process 400 begins at step/operation 401 when the predictive data analysis computing entity 106 performs one or more data intake operations to generate a group of disease-spread-related data objects. In some embodiments, performing the data intake operations includes: (i) intaking external public data into the predictive data analysis system 101 (e.g., determining when external data has been updated, pulling in data updates from external sources, pushing notification of data updates to interested parties, and/or the like), and (ii) cleansing of intake data for use in data processing (e.g., cleaning county/Federal Information Processing Standard Publication (FIPS) data to standardize the intake data, joining county-based data into an internal master geography dataset, standardizing formats for dates associated with data fields, and/or the like).

A disease-spread-related data object may describe one or more data fields associated with spread of a particular disease, such as one or more data fields associated with a number of active infection cases for the particular disease for a locality data object at a particular unit of time, one or more data fields associated with a number of reported deaths resulting from the particular disease for a locality data object at a particular unit of time, one or more data fields associated with adoption of control policy data objects associated with a locality data object at a particular unit of time, one or more data fields associated with locality sentiment designations for particular locality data objects with respect to particular control policy data objects, one or more data fields associated with locality adherence designations for particular locality data objects with respect to particular control policy data objects, one or more data fields associated with demographic features for particular locality data objects, and/or the like. For example, in some embodiments, a disease-spread-related data object may describe, for each locality data object of group of locality data objects describing a locality, at least one of the following: (i) one or more infectious disease counts for the locality with respect to a particular disease across a number of temporal units (e.g., a number of days); (ii) one or more disease-induced death counts for the locality with respect to the particular disease across the number of temporal units; (iii) one or more control policy data objects for the locality each describing a control policy adopted by the locality; (iv) for each control policy data object associated with the locality: (a) an adoption timestamp describing a temporal unit (e.g., a day) in which the corresponding control policy is adopted, (b) a locality sentiment designation for the locality data object with respect to the control policy data object, and (c) a locality adherence designation for the locality data object with respect to the control policy data object; and (v) one or more demographic features of the locality (e.g., a population count of the locality, a density measure for the locality, a sprawl measure for the locality, a mobility measure for the locality, and/or the like). Other examples of data that may be described by disease-spread-related data objects include: masking related data (e.g., Masks4all data, and/or the like), social media data (e.g., Twitter data, and/or the like), case count data (e.g., Worldometer data, USAFacts data, and/or the like), lab testing data (e.g. state reported data such as data reported via ca.gov), tourism spending data (e.g., ustravel.org data), state-based gross domestic product (GDP) data (e.g., bea.gov data), mobility data, applicable jurisdiction-based policy anchor points (e.g., retrieved via county or state department of health websites), and other environmental information as applicable (e.g., sentiment information gathered from non-social media sources such as surveys).

At step/operation 402, the predictive data analysis computing entity 106 performs one or more data processing operations on the group of disease-spread-related data objects to generate a projected periodic density change measure for the primary local-temporal pair data object. In some embodiments, performing step/operation 402 includes performing four main processes: (1) geography mapping, (2) environmental data mapping, (3) generating case prevalence and growth factors, and (4) generating relative importance measures for geographic units. In some embodiments, geography mapping includes mapping data to city levels, government geographic units (states, provinces, counties, and/or the like), and countries of interest across all data sources, determining the geographic location of specific cases, and identifying locations relative to an internal geographic mapping. In some embodiments, environmental data mapping includes mapping of discrete environmental data to each geographic unit. This data captures dynamics inherent to a geographical area—such as how mobile/active the population is, population demographics (e.g., socio-economic factors), regulatory environment of the area, and/or the like. Environmental data mapping may in some embodiments include determining applicable environmental data for a geographic unit and mapping the environmental data to historical data points. In some embodiments, environmental data mapping further includes incorporating available data from third-party pandemic solutions and/or from third-party geography-based analytics solutions, such as from COVID-Cast. In some embodiments, generating case prevalence and growth factors includes incorporation of algorithms and data manipulation to organize disease monitoring results into case and infection results by generating factors that measure disease prevalence such as case numbers, lab results, hospitalizations, mortality numbers, and/or like; determining current-day and historical prevalence factors by geography; determining current-day and historical growth trends by geography; and developing absolute and population-adjusted prevalence/growth metrics. In some embodiments, generating relative importance measures for geographic units includes: developing a mix/triangulation of metrics for each environmental, growth, and prevalence factor; determining geographic (e.g. state, MSA, county, city) and temporal relevance (e.g. day, week, month, year) measures for each factor; developing geographic unit clusters to stratify and categorize geographies and enable matching geographic units to historical data points, where the geographic unit cluster is determined based at least in part on comparing geography-wide disease prevalence factors, geography-wide disease growth factors, and geography-wide mobility factors; deriving projected disease prevalence measures for particular geographic units based at least in part on historical data associated with the particular geographic unit; and clustering geographies based at least in part on future disease prevalence in accordance with current-day prevalence factors, trend factors, and/or environmental factors.

In some embodiments, step/operation 402 may be performed in accordance with the process that is depicted in FIG. 6. At step/operation 601, the predictive data analysis computing entity 106 determines, based at least in part on the group of disease-spread-related data objects, a predictive profile for the primary local-temporal pair data object. In some embodiments, a predictive profile for a local-temporal pair data object that describes a set of features related to a projected density of a corresponding disease in a locality data object associated with the local-temporal pair data object at a corresponding temporal unit data object associated with the local-temporal pair data object. For example, the predictive profile for a local-temporal pair data object may be configured to describe at least one of the following: one or more prevalence-based density features for the primary local-temporal pair data object, one or more growth-based density features for the primary local-temporal pair data object, and one or more environment-based density features for the primary local-temporal pair data object. As further described below, the predictive profile for a local-temporal pair data object may be used to generate a subset of other local-temporal pair data objects that are deemed to be related to the particular local-temporal pair data object.

In some embodiments, step/operation 601 may be performed in accordance with the process that is depicted in FIG. 7. The process that is depicted in FIG. 7 begins at step/operation 701 when the predictive data analysis computing entity 106 determines one or more prevalence-based density features for the primary local-temporal pair data object.

A prevalence-based density feature for a local-temporal pair data object may describe a feature related to density of a disease in a locality data object associated with the local-temporal pair data object at a temporal unit data object associated with the local-temporal pair data object. Examples of prevalence-based density features for a local-temporal pair data object include: a current prevalence density measure that describes a measure of a number of infection cases for a disease in a locality data object associated with the local-temporal pair data object at a temporal unit data object associated with the local-temporal pair data object (e.g., sum of infection cases over the last 14 days per 100 thousands of people in a locality for a current day), a historical prevalence density measure that describes a measure of a number of infection cases for a disease in a locality data object associated with the local-temporal pair data object at historical time period related to a temporal unit data object associated with the local-temporal pair data object (e.g., average, over the last 30 historical days, of sums of cases over the last 14 days per 100 thousands of people in a geographic unit for the last 30 days per historical day), a current hospitalization prevalence density measure that describes a measure of a number of hospitalization cases for a disease in a locality data object associated with the local-temporal pair data object at a temporal unit data object associated with the local-temporal pair data object (e.g., sum of hospitalization cases over the last 14 days per 100 thousands of people in a locality for a current day), a current social media activity prevalence density measure that describes a measure of a number of affirmative social media activity cases for a disease in a locality data object associated with the local-temporal pair data object at a temporal unit data object associated with the local-temporal pair data object (e.g., sum of affirmative social medic activity cases over the last 14 days per 100 thousands of people in a locality for a current day), a current temperature prevalence density measure that describes a measure of a number of affirmative temperature-based detection cases for a disease in a locality data object associated with the local-temporal pair data object at a temporal unit data object associated with the local-temporal pair data object (e.g., sum of affirmative temperature-based detection cases over the last 14 days per 100 thousands of people in a locality for a current day), a periodic positive test change measure that describe a change in the ratio of affirmative test results for a disease in a locality data object associated with the local-temporal pair data object within a time period that is associated with the temporal unit data object for the local-temporal pair data object (e.g., a positive test change percentage for the last 15 days associated with the corresponding local-temporal pair data object), a periodic positive test measure that describe a ratio of affirmative test results for a disease in a locality data object associated with the local-temporal pair data object within a time period that is associated with the temporal unit data object for the local-temporal pair data object (e.g., a positive test percentage for the last 15 days associated with the corresponding local-temporal pair data object), and/or the like.

At step/operation 702, the predictive data analysis computing entity 106 determines one or more growth-based density features for the primary local-temporal pair data object. A growth-based density feature for a local-temporal pair data object may describe a feature related to change in density of a disease in a locality data object associated with the local-temporal pair data object at a temporal unit data object associated with the local-temporal pair data object. Examples of growth-based density features for a local-temporal pair data object include: a current prevalence density growth rate measure that describes a measure of a change in a number of infection cases for a disease in a locality data object associated with the local-temporal pair data object at a temporal unit data object associated with the local-temporal pair data object (e.g., a change in a sum of infection cases over the last 14 days per 100 thousands of people in a locality for a current day), a current hospitalization prevalence density growth rate measure that describes a change in a measure of a number of hospitalization cases for a disease in a locality data object associated with the local-temporal pair data object at a temporal unit data object associated with the local-temporal pair data object (e.g., a change in a sum of hospitalization cases over the last 14 days per 100 thousands of people in a locality for a current day), a current social media activity prevalence density growth rate measure that describes a change in a measure of a number of affirmative social media activity cases for a disease in a locality data object associated with the local-temporal pair data object at a temporal unit data object associated with the local-temporal pair data object (e.g., a change in sum of affirmative social medic activity cases over the last 14 days per 100 thousands of people in a locality for a current day), a current temperature prevalence density growth rate measure that describes a change in a measure of a number of affirmative temperature-based detection cases for a disease in a locality data object associated with the local-temporal pair data object at a temporal unit data object associated with the local-temporal pair data object (e.g., a change in a sum of affirmative temperature-based detection cases over the last 14 days per 100 thousands of people in a locality for a current day), a periodic positive test change measure that describe a change in the ratio of affirmative test results for a disease in a locality data object associated with the local-temporal pair data object within a time period that is associated with the temporal unit data object for the local-temporal pair data object (e.g., a positive test change percentage for the last 15 days associated with the corresponding local-temporal pair data object), a periodic positive test measure that describe a ratio of affirmative test results for a disease in a locality data object associated with the local-temporal pair data object within a time period that is associated with the temporal unit data object for the local-temporal pair data object (e.g., a positive test percentage for the last 15 days associated with the corresponding local-temporal pair data object), and/or the like.

At step/operation 703, the predictive data analysis computing entity 106 determines one or more environment-based density features for the primary local-temporal pair data object. An environment-based density feature for a local-temporal pair data object may describe at least one of the following: (i) a feature related to one or more social control policies (e.g., mask requirements policies) in place at a locality data object associated with the local-temporal pair data object during a temporal unit data object associated with the local-temporal pair data object, (ii) a feature related to detected population mobility patterns at a locality data object associated with the local-temporal pair data object during a temporal unit data object associated with the local-temporal pair data object, and (iii) a feature related to detected population sprawl patterns at a locality data object associated with the local-temporal pair data object during a temporal unit data object associated with the local-temporal pair data object. Examples of environment-based density features for a local-temporal pair data object include: a control policy temporal offset that describes how many days before or after a temporal unit data object associated with the local-temporal pair data object a disease control policy (e.g., a mask mandate) was imposed on a locality data object associated with the local-temporal data object, a periodic mobility measure that describes a detected mobility rate of a population (e.g., as inferred based at least in part on data reported by a global positioning system (GPS) software application such as Google Maps) of a locality data object associated with the local-temporal pair data object during a temporal unit data object associated with the local-temporal pair data object, features related to county-level mask requirements at a locality data object associated with the local-temporal pair data object during a temporal unit data object associated with the local-temporal pair data object, features related to back-to-school policies at a locality data object associated with the local-temporal pair data object during a temporal unit data object associated with the local-temporal pair data object, features related to lockdown restrictions at a locality data object associated with the local-temporal pair data object during a temporal unit data object associated with the local-temporal pair data object, features related to survey data for a locality data object associated with the local-temporal pair data object during a temporal unit data object associated with the local-temporal pair data object, features related to social media aggregation patterns for a locality data object associated with the local-temporal pair data object during a temporal unit data object associated with the local-temporal pair data object, features related to observed political leanings of a locality data object associated with the local-temporal pair data object during a temporal unit data object associated with the local-temporal pair data object, and/or the like.

At step/operation 704, the predictive data analysis computing entity 106 determines the predictive profile for the primary local-temporal pair data object based at least in part on at least one of the one or more prevalence-based density features for the primary local-temporal pair data object, the one or more growth-based density features for the primary local-temporal pair data object, and the one or more environment-based density features for the primary local-temporal pair data object. In some embodiments, the predictive data analysis computing entity 106 combines the one or more prevalence-based density features for the primary local-temporal pair data object, the one or more growth-based density features for the primary local-temporal pair data object, and the one or more environment-based density features for the primary local-temporal pair data object to generate the predictive profile for the primary local-temporal pair data object. As further described below, the predictive profile for a local-temporal pair data object may be used to generate a subset of other local-temporal pair data objects that are deemed to be related to the particular local-temporal pair data object.

Returning to FIG. 6, at step/operation 602, the predictive data analysis computing entity 106 determines one or more density modeling data objects based at least in part on the predictive profile associated with the local-temporal pair data object. A density modeling data object may describe a data object that relates one or more density features (e.g., one or more prevalence-based density features, one or more growth-based density features, and/or one or more environment-based density features) for each local-temporal pair data object of a group of local-temporal pair data objects (e.g., a group of local-temporal pair data objects having the same predictive profile as a primary local-temporal pair data object) to a disease spread prediction for the local-temporal pair data object (e.g., to a periodic density change measure for the local-temporal pair data object). Examples of density modeling data objects include prevalence-based density modeling data objects, growth-based density modeling data objects, and environment-based density modeling data objects.

In some embodiments, step/operation 602 may be performed in accordance with the process that is depicted in FIG. 8. The process that is depicted in FIG. 8 begins at step/operation 801 when the predictive data analysis computing entity 106 generates a prevalence-based density modeling data object. A prevalence-based density modeling data object may be a density modeling data object that relates each current periodic density measure of a local-temporal pair data object of a group of local-temporal pair data objects (e.g., a group of local-temporal pair data objects having the same predictive profile as a primary local-temporal pair data object) to a disease spread prediction for the local-temporal pair data object (e.g., to a periodic density change measure for the local-temporal pair data object). For example, the prevalence-based density modeling data object may relate each predictive profile current periodic density measure for a predictive profile local-temporal pair data object of the one or more predictive profile local-temporal pair data objects to a predictive profile periodic density change measure for the predictive profile local-temporal pair data object. The prevalence-based density modeling data object may further describe, for each local-temporal pair data object of the group of local-temporal pair data objects, a measure of a total number of records associated with the local-temporal pair data object and a periodic positive test change measure associated with the local-temporal pair data object.

At step/operation 802, the predictive data analysis computing entity 106 generates a growth-based density modeling data object. A growth-based density modeling data object may be a density modeling data object that relates each predictive profile periodic density growth rate measure of a local-temporal pair data object of a group of local-temporal pair data objects (e.g., a group of local-temporal pair data objects having the same predictive profile as a primary local-temporal pair data object) to a disease spread prediction for the local-temporal pair data object (e.g., to a periodic density change measure for the local-temporal pair data object). For example, the growth-based density modeling data object may relate each predictive profile periodic density growth rate measure for a predictive profile local-temporal pair data object of the one or more predictive profile local-temporal pair data objects to a predictive profile periodic density change measure for the predictive profile local-temporal pair data object. The growth-based density modeling data object may further describe, for each local-temporal pair data object of the group of local-temporal pair data objects, a measure of a total number of records associated with the local-temporal pair data object and a periodic positive test change measure associated with the local-temporal pair data object.

At step/operation 803, the predictive data analysis computing entity 106 generates an environment-based density modeling data object. An environment-based density modeling data object may be a density modeling data object that relates each control policy temporal offset measure of a local-temporal pair data object of a group of local-temporal pair data objects (e.g., a group of local-temporal pair data objects having the same predictive profile as a primary local-temporal pair data object) to a disease spread prediction for the local-temporal pair data object (e.g., to a periodic density change measure for the local-temporal pair data object). For example, the environment-based density modeling data object may relate each predictive profile control policy offset measure for a predictive profile local-temporal pair data object of the one or more predictive profile local-temporal pair data objects to a predictive profile periodic density change measure for the predictive profile local-temporal pair data object. The environment-based density modeling data object may further describe, for each local-temporal pair data object of the group of local-temporal pair data objects, a periodic mobility measure for the corresponding local-temporal pair data object and a grouping of the local-temporal pair data object that describes a subrange of the periodic mobility measure for the local-temporal pair data object in a total range of periodic mobility measures for all local-temporal pair data objects.

Returning to FIG. 6, at step/operation 603, the predictive data analysis computing entity 106 generates the projected periodic density change measure for the primary local-temporal pair data object based at least in part on the one or more density modeling data objects. A projected periodic density change measure describes a projected rate of change in a density measure for a disease at a locality data object associated with a corresponding local-temporal pair data object during a temporal unit data object associated with the corresponding local-temporal pair data object, where the projected rate of change may be determined based at least in part on performing predictive data analysis operations using rates of changes of density measures for the disease at other local-temporal pair data objects (e.g., other local-temporal-temporal data objects that are deemed related to the primary local-temporal pair data object). In some embodiments, to generate the projected periodic density measure for the primary local-temporal pair data object, the predictive data analysis computing entity 106 performs one or more pattern matching operations across the one or more density modeling data objects to determine distances between the predictive profile local-temporal pair data objects and the primary local-temporal pair data object in accordance with the density features for the predictive profile local-temporal pair data objects as described by density modeling data objects and the density features for the primary local-temporal pair data object, adjusts each periodic density change measure for a predictive profile local-temporal pair data object based at least in part on the determined distance for the predictive profile local-temporal pair data object, and combines the adjusted periodic density change measures for the predictive profile local-temporal pair data objects to generate the projected periodic density measure for the primary local-temporal pair data object.

Returning to FIG. 4, at step/operation 403, the predictive data analysis computing entity 106 performs one or more prediction-based actions based at least in part on the projected periodic density change measure for the primary local-temporal pair data object. Examples of prediction-based actions include: generating user interface data for one or more prediction output user interfaces and providing the user interface data to one or more client computing entities 102, displaying one or more prediction output user interfaces to an end user, generating notification data for one or more notification user interfaces and providing the notification data to one or more client computing entities 102, presenting one or more electronically-generated notifications to an end user, and/or the like.

In some embodiments, step/operation 403 may be performed in accordance with the process that is depicted in FIG. 9. The process that is depicted in FIG. 9 begins at step/operation 901 when the predictive data analysis computing entity 106 generates user interface data for a cross-temporal density visualization graph user interface element. An operational example of a prediction output user interface 1000 that includes a cross-temporal density visualization graph user interface element 1001 is depicted in FIG. 10.

As depicted in FIG. 10, the prediction output user interface 1000 depicts, within the cross-temporal density visualization graph user interface element 1001, a group of point user interface elements each corresponding to a local-temporal pair data object that in turn corresponds to a combination of a locality data object and a temporal unit data object. As further depicted in FIG. 10, the vertical axis 1011 of the cross-temporal density visualization graph user interface element 1001 corresponds to a current prevalence density measure (e.g., sum of cases over the last 14 days per 100 thousands of people in a locality for a current day) and the horizontal axis 1012 of the cross-temporal density visualization graph user interface element 1001 corresponds to a historical prevalence density measure (e.g., average, over the last 30 historical days, of sums of cases over the last 14 days per 100 thousands of people in a geographic unit for the last 30 days per historical day).

At step/operation 902, the predictive data analysis computing entity 106 generates user interface data for a prevalence-based density visualization graph user interface element. The prevalence-based density visualization graph user interface element may describe a user interface element that describes, using a graph, at least some of the data described by a prevalence-based density modeling data object.

An operational example of a prediction output user interface 1100 that includes a prevalence-based density visualization graph user interface element 1101 is depicted in FIG. 11. As depicted in FIG. 11, the prediction output user interface 1100 depicts, within the prevalence-based density visualization graph user interface element 1101, a group of point user interface elements each corresponding to a local-temporal pair data object that in turn corresponds to a combination of a locality data object and a temporal unit data object. As further depicted in FIG. 11, the vertical axis 1111 of the prevalence-based density visualization graph user interface element 1101 corresponds to a periodic density change measure (e.g., change in case density over 15 days) and the horizontal axis 1112 of the prevalence-based density visualization graph user interface element 1101 corresponds to a periodic density measure (e.g., case density over 15 days). As further depicted in FIG. 11, the size of each point user interface element is determined based at least in part on a relative measure of the total number of data records associated with the corresponding local-temporal pair data object. As further depicted in FIG. 11, the color of each point user interface element is determined based at least in part on a relative measure of a periodic positive test change measure (e.g., a positive test change percentage for the last 15 days associated with the corresponding local-temporal pair data object). As further depicted in FIG. 11, the numerical depiction accompanying each point user interface element represents a periodic positive test change measure associated with the corresponding local-temporal pair data object.

Another operational example of a prediction output user interface 1600 that includes a prevalence-based density visualization graph user interface element 1601 is depicted in FIG. 16. As depicted in FIG. 16, the prediction output user interface 1600 depicts, within the prevalence-based density visualization graph user interface element 1601, a group of point user interface elements each corresponding to a local-temporal pair data object that in turn corresponds to a combination of a locality data object and a temporal unit data object. As further depicted in FIG. 16, the vertical axis 1611 of the prevalence-based density visualization graph user interface element 1601 corresponds to a periodic density change measure (e.g., change in case density over 15 days) and the horizontal axis 1612 of the prevalence-based density visualization graph user interface element 1601 corresponds to a periodic density measure (e.g., case density over 15 days).

As further depicted in FIG. 16, interacting with a point user interface element within the prevalence-based density visualization graph user interface element 1601 that is associated with a local-temporal pair data object causes updating a trend visualization user interface element 1621, where, subsequent to the noted update, each box user interface element within a central region 1623 of the trend visualization user interface element 1621 describes, given a corresponding assumption about whether the local-temporal pair data object fails to satisfy a set of control policy criteria, has a particular subrange of a periodic density growth measure, and has a particular subrange of a periodic density change measure, a current prevalence density measure (e.g., sum of cases over the last 14 days per 100 thousands of people in a locality for a current day) for the local-temporal pair data object and a historical prevalence density measure (e.g., average, over the last 30 historical days, of sums of cases over the last 14 days per 100 thousands of people in a geographic unit for the last 30 days per historical day) for the local-temporal pair data object. For example, the box user interface element 1631 describes that the current prevalence density measure for a selected local-temporal pair data object is 18.5 given no mask requirements for 30 days prior to a current day, zero percent periodic density growth measure, and −20% periodic density change measure, and that the historical prevalence density measure for a selected local-temporal pair data object is 15 given no mask requirements for 30 days prior to a current day, zero percent periodic density growth measure, and −20% periodic density change measure.

As further depicted in FIG. 16, a highlighted box user interface element within a central region 1623 of the trend visualization user interface element 1621 describes, given a corresponding observation about whether the local-temporal pair data object fails to satisfy a set of control policy criteria, has a particular subrange of a periodic density growth measure, and has a particular subrange of a periodic density change measure, a current prevalence density measure (e.g., sum of cases over the last 14 days per 100 thousands of people in a locality for a current day) for the local-temporal pair data object and a historical prevalence density measure (e.g., average, over the last 30 historical days, of sums of cases over the last 14 days per 100 thousands of people in a geographic unit for the last 30 days per historical day) for the local-temporal pair data object. For example, the highlighted box user interface element 1632 describes that the current prevalence density measure for a selected local-temporal pair data object is 117.7 given observations about no mask requirements for 30 days prior to a current day, zero percent periodic density growth measure, and +50% periodic density change measure, and that the historical prevalence density measure for a selected local-temporal pair data object is 15 given observations about no mask requirements for 30 days prior to a current day, zero percent periodic density growth measure, and +50% periodic density change measure.

As further depicted in FIG. 16, each field of the test pattern visualization user interface element 1624 describes a periodic density change measure and a current prevalence density measure for an assumed periodic positive test change measure associated with a selected local-temporal pair. For example, the field 1641 describes that, assuming 0.0%, the selected local-temporal pair is associated with a periodic density change measure of 126.3 a current prevalence density measure of 373.2. The highlighted field 1624 describes a periodic density change measure and a current prevalence density measure for an observed periodic positive test change measure associated with a selected local-temporal pair.

Returning to FIG. 9, at step/operation 903, the predictive data analysis computing entity 106 generates user interface data for a growth-based density visualization graph user interface element. The growth-based density visualization graph user interface element may describe a user interface element that describes, using a graph, at least some of the data described by a growth-based density modeling data object.

An operational example of a prediction output user interface 1200 that includes a growth-based density visualization graph user interface element 1201 is depicted in FIG. 12. As depicted in FIG. 12, the prediction output user interface 1200 depicts, within the growth-based density visualization graph user interface element 1201, a group of point user interface elements each corresponding to a local-temporal pair data object that in turn corresponds to a combination of a locality data object and a temporal unit data object. As further depicted in FIG. 12, the vertical axis 1211 of the growth-based density visualization graph user interface element 1201 corresponds to a periodic density change measure (e.g., change in case density over 15 days) and the horizontal axis 1212 of the growth-based density visualization graph user interface element 1201 corresponds to a periodic density growth rate measure (e.g., case density growth over 15 days). As further depicted in FIG. 12, the size of each point user interface element is determined based at least in part on a relative measure of the total number of data records associated with the corresponding local-temporal pair data object. As further depicted in FIG. 12, the color of each point user interface element is determined based at least in part on a relative measure of a periodic positive test change measure (e.g., a positive test change percentage for the last 15 days) for the corresponding local-temporal pair data object. As further depicted in FIG. 12, the numerical depiction accompanying each point user interface element represents a periodic positive test change measure associated with the corresponding local-temporal pair data object.

At step/operation 904, the predictive data analysis computing entity 106 generates user interface data for an environment-based density visualization graph user interface element. The growth-based density visualization graph user interface element may describe a user interface element that describes, using a graph, at least some of the data described by an environment-based density modeling data object.

An operational example of a prediction output user interface 1300 that includes an environment-based density visualization graph user interface element 1301 is depicted in FIG. 13. As depicted in FIG. 13, the prediction output user interface 1300 depicts, within the environment-based density visualization graph user interface element 1301, a group of point user interface elements each corresponding to a local-temporal pair data object that in turn corresponds to a combination of a locality data object and a temporal unit data object. As further depicted in FIG. 13, the vertical axis 1311 of the environment-based density visualization graph user interface element 1301 corresponds to a periodic density change measure (e.g., change in case density over 15 days) and the horizontal axis 1312 of the environment-based density visualization graph user interface element 1301 corresponds to a control policy temporal offset (e.g., a number of days before or after a mask mandate policy). As further depicted in FIG. 13, the size of each point user interface element is determined based at least in part on a relative measure of the total number of data records associated with the corresponding local-temporal pair data object. As further depicted in FIG. 13, the color of each point user interface element is determined based at least in part on a relative measure of a periodic mobility measure for the corresponding local-temporal pair data object. As further depicted in FIG. 13, the numerical depiction accompanying each point user interface element represents a periodic mobility measure for the corresponding local-temporal pair data object. As further depicted in FIG. 13, the horizontal axis 1312 of the environment-based density visualization graph user interface element 1301 is divided into segments to capture different groupings of point user interface elements based at least in part on periodic mobility measures of local-temporal pair data objects associated with the point user interface elements.

At step/operation 905, the predictive data analysis computing entity 106 generates user interface data for a hybrid density visualization graph user interface element. The hybrid density visualization graph user interface element may depict, using a graph, at least some of the data described by two or more of a prevalence-based density modeling data object, a growth-based density modeling data object, and an environment-based density modeling data object.

An operational example of a prediction output user interface 1400 that includes a hybrid density visualization graph user interface element 1401 is depicted in FIG. 14. As depicted in FIG. 14, the prediction output user interface 1400 depicts, within the hybrid density visualization graph user interface element 1401, a group of point user interface elements each corresponding to a local-temporal pair data object that in turn corresponds to a combination of a locality data object and a temporal unit data object. As further depicted in FIG. 14, the lower segment 1421 of the hybrid density visualization graph user interface element 1401 depicts a segment of the point user interface elements that are associated with a group of local-temporal pair data objects that fail to satisfy a set of control policy criteria (e.g., are not recorded to have required masked 45 days prior to a current day), while the upper segment 1422 of the hybrid density visualization graph user interface element 1401 depicts a segment of the point user interface elements that are associated with a group of local-temporal pair data objects that satisfy a set of control policy criteria (e.g., are recorded to have required masked 45 days prior to a current day). As further depicted in FIG. 14, the vertical axis 1411 of the hybrid density visualization graph user interface element 1401 corresponds to a periodic density change measure (e.g., change in case density over 30 days) and the horizontal axis 1412 of the hybrid density visualization graph user interface element 1401 corresponds to a periodic positive test change measure associated with the corresponding local-temporal pair data object. As further depicted in FIG. 14, the color of each point user interface element is determined based at least in part on a relative measure of a periodic density growth rate measure (e.g., case density growth over 15 days) associated with the corresponding local-temporal pair data object. As further depicted in FIG. 14, the vertical axis 1311 of the hybrid density visualization graph user interface element 1401 is divided into segments based at least in part on groupings of point user interface elements that are determined based at least in part on periodic mobility measures for the local-temporal pair data objects associated with the point user interface elements.

At step/operation 906, the predictive data analysis computing entity 106 generates user interface data for a locality ranking user interface element that describes a ranked list of locality data objects that: (i) are deemed to have a similar predictive profile as a primary local-temporal pair data object, and (ii) have the highest levels of recorded periodic density growth rate measures on the temporal unit associated with the temporal unit data object in the primary local-temporal pair data object.

An operational example of a prediction output user interface element 1500 that includes a locality ranking user interface element 1501 is depicted in FIG. 15. As depicted in FIG. 15, the locality ranking user interface element 1501 depicts, for each temporal unit data object of a group of temporal unit data objects, a ranked list of locality data objects that: (i) are deemed to have a similar predictive profile as the primary locality data object 1511, and (ii) have the highest levels of recorded periodic density growth rate measures on the temporal unit associated with the temporal unit data object. As described above, determining whether a locality data object falls within the predictive profile of a primary locality data object may be determined based at least in part on at least one of prevalence-based density features, growth-based density features, and environmental features. As further depicted in FIG. 15, the numerical depiction accompanying a reference to a locality data object in relation to a temporal unit data object describes a recorded periodic density growth rate measure for the locality data object on the temporal unit associated with the temporal unit data object.

At step/operation 907, the predictive data analysis computing entity 106 generates user interface data for a prediction output user interface that describes at least one of the cross-temporal density visualization graph user interface element, the prevalence-based density visualization graph user interface element, the growth-based density visualization graph user interface element, the environment-based density visualization graph user interface element, the hybrid-based density visualization graph user interface element, and a locality ranking user interface element. In some embodiments, to generate the user interface data for the prediction output user interface, the predictive data analysis computing entity 106 combines (e.g., as tabs of the prediction output user interface element) at least one of the following: the user interface data for the cross-temporal density visualization graph user interface element, the user interface data for the prevalence-based density visualization graph user interface element, the user interface data for the growth-based density visualization graph user interface element, the user interface data for the environment-based density visualization graph user interface element, the user interface data for the hybrid-based density visualization graph user interface element, and the user interface data for the locality ranking user interface element. In some embodiments, subsequent to generate the user interface data for the prediction output user interface, the predictive data analysis computing entity 106 transmits/provides the user interface data to one or more client computing entities 102.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method comprising:
determining, by one or more processors and based at least in part on one or more prevalence-based density features for a primary local-temporal pair data object and one or more growth-based density features for the primary local-temporal pair data object, a predictive profile for the primary local-temporal pair data object, wherein the primary local-temporal pair data object is associated with a primary locality data object and a primary temporal unit data object;
determining, by the one or more processors and based at least in part on the predictive profile, one or more predictive profile local-temporal pair data objects for the primary local-temporal pair data object, wherein the one or more predictive profile local-temporal pair data objects have one or more control policy temporal offsets and a same predictive profile as the primary local-temporal pair data object;
generating, by the one or more processors, a prevalence-based density modeling data object, where the prevalence-based density modeling data object relates one or more predictive profile current periodic density measures for one or more predictive profile local-temporal pair data objects of the one or more predictive profile local-temporal pair data objects to one or more predic- tive profile periodic density change measures for the one or more predictive profile local-temporal pair data objects;

generating, by the one or more processors, a growth-based density modeling data object, where the growth-based density modeling data object relates one or more predictive profile periodic density growth rate measures for one or more predictive profile local-temporal pair data objects of the one or more predictive profile local-temporal pair data objects to one or more predictive profile periodic density change measures for the one or more predictive profile local-temporal pair data objects;

generating, by the one or more processors and based at least in part on the prevalence-based density modeling data object and the growth-based density modeling data object, a projected periodic density change measure for the primary local-temporal pair data object; and initiating, by the one or more processors, the performance of one or more prediction-based actions based at least in part on the projected periodic density change measure.

2. The computer-implemented method of claim 1, wherein the predictive profile is determined based at least in part on one or more environment-based density features for the primary local-temporal pair data object.

3. The computer-implemented method of claim 1, further comprising:

generating, by the one or more processors, an environment-based density modeling data object that relates at least one control policy temporal offset of the one or more control policy temporal offsets for one or more predictive profile local-temporal pair data objects of the one or more predictive profile local-temporal pair data objects to one or more predictive profile periodic density change measures for the one or more predictive profile local-temporal pair data objects, wherein the at least one control policy temporal offset comprises a number of days before or after a temporal unit data object associated with the one or more predictive profile local-temporal pair data objects a disease control policy was imposed on a locality data object associated with the one or more predictive profile local-temporal pair data objects, wherein the projected periodic density change measure for the primary local-temporal pair data object is generated further based at least in part on the environment-based density modeling data object.

4. The computer-implemented method of claim 3, wherein: (i) initiating the performance of the one or more prediction-based actions comprises providing user interface data for a prediction output user interface that comprises an environment-based density visualization graph user interface element, and (ii) the environment-based density visualization graph user interface element is determined based at least in part on the environment-based density modeling data object.

5. The computer-implemented method of claim 4, wherein: (i) the environment-based density visualization graph user interface element comprises a horizontal axis and a vertical axis, (ii) the environment-based density visualization graph user interface element depicts one or more point user interface elements each associated with a predictive profile local-temporal pair data object of the one or more predictive profile local-temporal pair data objects, (iii) the horizontal axis corresponds to each predictive profile periodic density change measure for a predictive profile local-temporal pair data object of the one or more predictive profile local-temporal pair data objects, and (iv) the vertical axis corresponds to each control policy temporal offset for a predictive profile local-temporal pair data object of the one or more predictive profile local-temporal pair data objects.

6. The computer-implemented method of claim 5, wherein one or more color values for a point user interface element of the one or more point user interface elements correspond to a relative measure of a periodic mobility measure for the corresponding predictive profile local-temporal data object that is associated with the point user interface element.

7. The computer-implemented method of claim 5, wherein one or more numerical depictions for a point user interface element of the one or more point user interface elements correspond to a periodic mobility measure for the corresponding predictive profile local-temporal data object that is associated with the point user interface element.

8. The computer-implemented method of claim 1, wherein: (i) initiating the performance of the one or more prediction-based actions comprises providing user interface data for a prediction output user interface that comprises a prevalence-based density visualization graph user interface element, and (ii) the prevalence-based density visualization graph user interface element is determined based at least in part on the prevalence-based density modeling data object.

9. The computer-implemented method of claim 8, wherein: (i) the prevalence-based density visualization graph user interface element comprises a horizontal axis and a vertical axis, (ii) the prevalence-based density visualization graph user interface element depicts one or more point user interface elements each associated with a predictive profile local-temporal pair data object of the one or more predictive profile local-temporal pair data objects, (iii) the horizontal axis corresponds to each predictive profile periodic density change measure for a predictive profile local-temporal pair data object of the one or more predictive profile local-temporal pair data objects, and (iv) the vertical axis corresponds to each predictive profile periodic density measure for a predictive profile local-temporal pair data object of the one or more predictive profile local-temporal pair data objects.

10. The computer-implemented method of claim 9, wherein one or more color values for a point user interface element of the one or more point user interface elements correspond to a relative measure of a periodic positive test change measure for the corresponding predictive profile local-temporal data object that is associated with the point user interface element.

11. The computer-implemented method of claim 9, wherein one or more numerical depictions for a point user interface element of the one or more point user interface elements correspond to a periodic positive test change measure for the corresponding predictive profile local-temporal data object that is associated with the point user interface element.

12. The computer-implemented method of claim 1, wherein: (i) initiating the performance of the one or more prediction-based actions comprises providing user interface data for a prediction output user interface that comprises a growth-based density visualization graph user interface element, and (ii) the growth-based density visualization graph user interface element is determined based at least in part on the prevalence-based density modeling data object.

13. The computer-implemented method of claim 12, wherein: (i) the growth-based density visualization graph user interface element comprises a horizontal axis and a vertical axis, (ii) the growth-based density visualization graph user interface element depicts one or more point user interface elements each associated with a predictive profile local-temporal pair data object of the one or more predictive profile local-temporal pair data objects, (iii) the horizontal axis corresponds to each predictive profile periodic density change measure for a predictive profile local-temporal pair data object of the one or more predictive profile local-temporal pair data objects, and (iv) the vertical axis corresponds to each predictive profile periodic density growth rate measure for a predictive profile local-temporal pair data object of the one or more predictive profile local-temporal pair data objects.

14. The computer-implemented method of claim 13, wherein one or more color values for a point user interface element of the one or more point user interface elements correspond to a relative measure of a periodic positive test change measure for the corresponding predictive profile local-temporal data object that is associated with the point user interface element.

15. The computer-implemented method of claim 14, wherein one or more numerical depictions for a point user interface element of the one or more point user interface elements correspond to a periodic positive test change measure for the corresponding predictive profile local-temporal data object that is associated with the point user interface element.

16. An apparatus comprising one or more processors and at least one memory including program code, the at least one memory and the program code configured to, with the one or more processors, cause the apparatus to at least:
  determine, based at least in part on one or more prevalence-based density features for a primary local-temporal pair data object and one or more growth-based density features for the primary local-temporal pair data object, a predictive profile for the primary local-temporal pair data object, wherein the primary local-temporal pair data object is associated with a primary locality data object and a primary temporal unit data object;
  determine, based at least in part on the predictive profile, one or more predictive profile local-temporal pair data objects for the primary local-temporal pair data object, wherein the one or more predictive profile local-temporal pair data objects have one or more control policy temporal offsets and a same predictive profile as the primary local-temporal pair data object;
  generate a prevalence-based density modeling data object, where the prevalence-based density modeling data object relates one or more predictive profile current periodic density measures for one or more predictive profile local-temporal pair data objects of the one or more predictive profile local-temporal pair data objects to one or more predictive profile periodic density change measures for the one or more predictive profile local-temporal pair data objects;
  generate a growth-based density modeling data object, where the growth-based density modeling data object relates one or more predictive profile periodic density growth rate measures for one or more predictive profile local-temporal pair data objects of the one or more predictive profile local-temporal pair data objects to one or more predictive profile periodic density change measures for the one or more predictive profile local-temporal pair data objects;
  generate, based at least in part on the prevalence-based density modeling data object and the growth-based density modeling data object, a projected periodic density change measure for the primary local-temporal pair data object; and
  initiate the performance of one or more prediction-based actions based at least in part on the projected periodic density change measure.

17. The apparatus of claim 16, wherein the predictive profile is determined based at least in part on one or more environment-based density features for the primary local-temporal pair data object.

18. The apparatus of claim 16, wherein: (i) initiating the performance of the one or more prediction-based actions comprises providing user interface data for a prediction output user interface that comprises a prevalence-based density visualization graph user interface element, and (ii) the prevalence-based density visualization graph user interface element is determined based at least in part on the prevalence-based density modeling data object.

19. The apparatus of claim 16, wherein: (i) initiating the performance of the one or more prediction-based actions comprises providing user interface data for a prediction output user interface that comprises a growth-based density visualization graph user interface element, and (ii) the growth-based density visualization graph user interface element is determined based at least in part on the prevalence-based density modeling data object.

20. At at least one non-transitory computer-readable storage medium having computer-readable program code portions stored therein, the computer-readable program code portions configured to:
  determine, based at least in part on one or more prevalence-based density features for a primary local-temporal pair data object and one or more growth-based density features for the primary local-temporal pair data object, a predictive profile for the primary local-temporal pair data object, wherein the primary local-temporal pair data object is associated with a primary locality data object and a primary temporal unit data object;
  determine, based at least in part on the predictive profile, one or more predictive profile local-temporal pair data objects for the primary local-temporal pair data object, wherein the one or more predictive profile local-temporal pair data objects have one or more control policy temporal offsets and a same predictive profile as the primary local-temporal pair data object;
  generate a prevalence-based density modeling data object, where the prevalence-based density modeling data object relates one or more predictive profile current periodic density measures for one or more predictive profile local-temporal pair data objects of the one or more predictive profile local-temporal pair data objects to one or more predictive profile periodic density change measures for the one or more predictive profile local-temporal pair data objects;
  generate a growth-based density modeling data object, where the growth-based density modeling data object relates one or more predictive profile periodic density growth rate measures for one or more predictive profile local-temporal pair data objects of the one or more predictive profile local-temporal pair data objects to one or more predictive profile periodic density change measures for the one or more predictive profile local-temporal pair data objects;
  generate, based at least in part on the prevalence-based density modeling data object and the growth-based density modeling data object, a projected periodic density change measure for the primary local-temporal pair data object; and initiate the performance of one or more prediction-based actions based at least in part on the projected periodic density change measure.

* * * * *

UNITED STATES PATENT AND TRADEMARK OFFICE
CERTIFICATE OF CORRECTION

PATENT NO. : 11,899,694 B2
APPLICATION NO. : 17/316043
DATED : February 13, 2024
INVENTOR(S) : Mario M. Suarez et al.

It is certified that error appears in the above-identified patent and that said Letters Patent is hereby corrected as shown below:

In the Claims

In Column 36, Line 28, Claim 20, delete "At at least" and insert -- At least --, therefor.

Signed and Sealed this
Seventh Day of May, 2024

Katherine Kelly Vidal
*Director of the United States Patent and Trademark Office*